United States Patent
Soto et al.

(10) Patent No.: US 7,672,591 B2
(45) Date of Patent: Mar. 2, 2010

(54) SYSTEM AND METHOD FOR A SUBSCRIBER-POWERED NETWORK ELEMENT

(76) Inventors: Alexander I. Soto, 7673 Hazard Center Dr., San Diego, CA (US) 92108; Walter G. Soto, 2020 Costero Hermosa, San Clemente, CA (US) 92673

( * ) Notice: Subject to any disclaimer, the term of this patent is extended or adjusted under 35 U.S.C. 154(b) by 73 days.

(21) Appl. No.: 11/764,228

(22) Filed: Jul. 17, 2007

(65) Prior Publication Data
US 2008/0159744 A1    Jul. 3, 2008

Related U.S. Application Data

(63) Continuation-in-part of application No. 11/369,512, filed on Mar. 1, 2006.

(60) Provisional application No. 60/657,511, filed on Mar. 1, 2005.

(51) Int. Cl.
*H04J 14/00* (2006.01)

(52) U.S. Cl. .............. 398/72; 398/71; 398/66

(58) Field of Classification Search ........... 398/58, 398/66, 70, 71, 72, 38, 171, 69, 67; 725/129, 725/130
See application file for complete search history.

(56) References Cited

U.S. PATENT DOCUMENTS

| | | | | |
|---|---|---|---|---|
| 5,523,868 A * | 6/1996 | Hawley | | 398/38 |
| 5,917,624 A * | 6/1999 | Wagner | | 398/71 |
| 5,935,209 A | 8/1999 | Budhraja et al. | | |
| 6,178,178 B1 * | 1/2001 | Wallace et al. | | 370/465 |
| 6,886,181 B1 * | 4/2005 | Dodds et al. | | 725/119 |
| 7,135,956 B2 * | 11/2006 | Bartone et al. | | 340/3.9 |
| 7,277,637 B2 * | 10/2007 | Jette et al. | | 398/70 |
| 2003/0123648 A1 | 7/2003 | Ashton et al. | | |

OTHER PUBLICATIONS

Keku Mistry, "Powering Fiber-in-the-Loop Systems", IEEE LTS, Nov. 1992, pp. 36-44.
PowerDsine Inc., "Application Notes: xDSL Power Modules Design Recommendations", Apr. 2002.
Salloum et al, "Bellcore's Proposed Requirements For Fiber In The Loop Systems", Feb. 1993, ISBN: 0-7803-0950, pp. 1586-1590.

* cited by examiner

*Primary Examiner*—M. R. Sedighian
(74) *Attorney, Agent, or Firm*—James Albert Ward

(57) ABSTRACT

A system for powering a network element of a fiber optic communication network. When communication data is transferred between a central office (CO) and a subscriber gateway using a network element to convert optical to electrical (O-E) and electrical to optical (E-O) signals between a fiber from the central office and copper wires or coax cable from the subscriber gateway, techniques related to local powering of a network element or drop site by a subscriber or customer remote device or gateway are provided. Certain advantages and/or benefits are achieved using the present invention, such as freedom from any requirement for additional meter installations or meter connection charges. Additionally the system is free of monthly meter charges and does not require a separate power network.

1 Claim, 19 Drawing Sheets

SYSTEM AND METHOD FOR A SUBSCRIBER-POWERED NETWORK ELEMENT

CROSS-REFERENCES TO RELATED APPLICATIONS

This application is filed under 37 C.F.R. §1.53(b) as a continuation-in-part of patent application Ser. No. 11/369,512, which was filed on Mar. 01, 2006 under 37 C.F.R. §1.53(b) claiming the benefit under 35 U.S.C. 119(e) of the provisional Patent Application No. 60/657,511 filed on Mar. 01, 2005, now abandoned.

FIELD OF THE INVENTION

The invention relates generally to fiber optic communication networks, more specifically to the powering architecture of broadband access networks and particularly to subscriber powering of broadband access networks.

BACKGROUND OF THE INVENTION

With increasing customer demand for transmitting and receiving increasingly greater amounts of information, telecommunication and cable companies are being pushed to upgrade their communication network infrastructures. In order to supply more information in the form of video, audio and telephony at higher rates, higher bandwidth communication network upgrades are required. Twisted copper wire does not support high bandwidths over a great distance and while coax cable does a better job, it too has reach and bandwidth limitations. Optical fiber can provide virtually unlimited bandwidth thus enabling broadband and multimedia services.

Modern telephone communication network infrastructures, such as fiber in the loop networks (FITL), utilize a combination of fiber optics and twisted pair wire to send communications data to a customer. While modern cable communication network infrastructures, such as Hybrid Fiber Coax networks (HFC), utilize a combination of fiber optics and coax cable to send communication data to a customer. Generally, customers are served by the twisted pair wire or coax cable in the last mile of the telecommunication networks or within the last two to three miles of cable networks. In order to achieve high bandwidths at a customer location, the fiber optic loop must be brought closer to the customer so that the copper drop is of a sufficiently short distance and will be capable of supporting higher data transfer rates.

One major problem with bringing fiber cable within a short distance of a customer location is the added burden of maintaining the multitude of optical to copper drop sites. These drop sites are network elements that are called optical network units (ONUs) or optical network terminals (ONTs) in telecommunication networks and optical node (or simply a node) in cable networks and generally serve to convert signals between the optical domain of a fiber and electrical domain of a twisted copper wire or coax cable.

A significant part of the maintenance of these drop sites is supplying their power requirements. Optical fiber itself is not capable of carrying the electricity to power these drop sites. This creates a challenge in planning, distributing and deployment of electricity to power the drop sites' energy needs. Furthermore, reserve power must also be provided if the main power to the drop site fails with enough reserve capacity capable of meeting performance and reliability requirements of the network. This is often the case with Lifeline telephony service, which is required on telecommunication networks. Lifeline telephone means that the customer telephones must remain energized and operational during an AC power interruption or outage.

The subscriber gateway or customer premise equipment (CPE) found at the terminal end of the telecommunication and cable networks are assumed to be provided with power and reserve power from the subscriber or customer premise. The drop sites can be centrally powered from a distributed copper facility or a power node located near a cluster of drop sites, or locally powered from a nearby commercial power source, or with solar photovoltaic energy.

In the case of centralized power, power can be provided over new or existing copper facilities. Power can also be provided on separate twisted pair wire or coax cable that are bonded to the outside of a fiber or deployed with the fiber during installation of the fiber. However, centralized power is a strategy that requires a separate power network to be deployed that is separate from the information network. With increasing distances between a central office (CO) or head end to the remote drop sites increased voltages are required on the power network to feed the drop site energy needs. However, increased voltages raise craft safety issues. The power network may be augmented with power nodes located near a cluster of drop sites, however additional metallic enclosures increase susceptibility to electrical surges caused by lightning and power-line induction. Furthermore, there is the 24-hour a day cost of supplying electricity to the power network, as well as regular maintenance and support of the power network itself including regular replacement of batteries for Lifeline services, which are generally located at the CO or head end.

In the case of locally powered drop sites, power is derived near a drop site and reserve power is provided with batteries at the drop site. The primary energy source for this architecture is commercial AC power tapped from a power utility's facility. The power supply is placed in a small environmentally hardened enclosure that could be co-located with a drop site; however, the batteries are generally in the same enclosure as the drop site. This results in a large number of battery sites and power access points. Generally the cost of this type of system is high primarily due to the cost of connecting drop sites to a commercial power source. Regional power utility companies may insist on metered connections to their power grid, incurring a one-time ac meter installation and connection charge to be levied. Additionally a minimum monthly meter charge may be levied regardless of usage. This poses a major problem when the monthly energy consumption of a drop site is significantly lower than the minimum charge.

In the case of powering the communication network infrastructure with solar power, this strategy minimizes some of the disadvantages of centralized and locally powering such as vulnerability to lightning and limited battery reserve, allowing fiber to be the sole distribution facility. Solar panels and large batteries are co-located at drop sites, which power the drop sites continuously without any connection to any power gird. However, its use is limited to areas with direct access to sunlight as the output of solar panels decreases with a reduction in incident solar energy. Therefore, this strategy cannot be used everywhere. In addition, solar power requires the highest amount of battery capacity (Wh) to be installed.

As such, a need exists for a system and method for powering a fiber optic communication network that brings fiber within a short distance of a subscriber or customer location. The power strategy or architecture of the fiber optic communication network must be capable of supporting and operating the multitude of drop sites in a cost effective and maintainable manner.

BRIEF SUMMARY OF THE INVENTION

According to the present invention, techniques related to local powering of a network element or drop site by a subscriber or customer remote device or gateway are provided. Certain advantages and/or benefits may be achieved using the present invention. For example, the present invention has the advantage of being free of any requirement for additional meter installations or meter connection charges. Additionally the present invention is free of monthly meter charges, although local regulations may require reimbursement to subscribers for power used. Furthermore, the present invention does not create a separate power network. The information network and the power network are the same network.

In general, in one aspect, the invention includes a system for powering a network element of a fiber optic communication network, such as a fiber in the loop network, which transmits communication data between a central office (CO) and subscriber gateway or customer premise equipment. The network element, such as a drop site, serves to convert optical to electrical (O-E) and electrical to optical (E-O) signals between a fiber from the central office and copper wires to the subscriber's gateway. The subscriber gateway or a remote user device further includes a DC power source, a high-speed client modem, and a Subscriber Line Interface Circuit (SLIC) device that includes means for coupling the communications of the client modem and the DC power output of the DC power source. The network element further includes a high-speed CO modem, a DC-to-DC power converter, and a Data Access Arrangement (DAA) device that includes means for coupling communications of the CO modem and delivers the DC power from the subscriber gateway to the DC-to-DC power converter. A pair of copper wires that is in electrical communication between the subscriber gateway and the network element serves as a medium for DC power transfer to the network element and for modem communications. In this way, the network element is powered by the subscriber premise over the copper wires and the modems are in communication over the same copper wires.

Aspects of the invention may include one or more of the following features. The fiber optic network is a fiber in the loop network such as a Fiber to the Curb (FTTC) network, a Fiber to the Premise (FTTP) network, a Fiber to the Node (FTTN) network, or a Fiber to the Basement (FTTB) network. Furthermore, the Fiber in the loop network may be a point-to-point network or a point-to-multipoint network, such as a Passive Optical Network (PON). For example, the Fiber in the loop network may be a point-to-point Fiber to the Curb network (FTTC-P2P) or a passive optical Fiber to the Curb network (FTTC-PON) implementation. The modems, according to the invention, may be Digital Subscriber Line (xDSL) type of modems such as Asymmetric Digital Subscriber Line (ADSL) modems, Very-high-bit-rate Digital Subscriber line (VDSL) modems, or Very-high-bit-rate Digital Subscriber Line 2 (VDSL2) modems. The modems may also be Power Line, also called Power Line Communication or Power Line Carrier (PLC), modems. The SLIC and DAA devices may comprise coupling capacitors, coupling transformers, blocking inductors, or perform inductive coupling. Furthermore, the SLIC and DAA devices may include elements for low pass filtering, bandpass filtering, and/or high pass filtering. The SLIC device will limit the current of the transmitted DC power to non-hazardous levels. The pair of copper wires is a twisted copper wire pair such as 22 or 24 gauge twisted copper pair, but may also be a single pair from a category 3 cable, or a single pair from a category 5 cable. The network element that is powered by the subscriber maybe an optical network unit (ONU) or an optical network terminal (ONT). The subscriber gateway, customer premise equipment or remote user device may further include one or more of the following features for remote user use: an Ethernet local area network (LAN), a WiFi network, a Voice over IP (VoIP) service, or an IPTV service. The subscriber gateway, customer premise equipment or remote user device my also provide Plain Old Telephone Service (POTS) and include a battery backup incase of subscriber mains power loss to provide lifeline support. The battery may be user, customer or subscriber replaceable. The battery may also be located at the network element. The DC power supply at the subscriber or customer premise may be a DC-to-DC power supply or an AC-to-DC power supply.

In general, in another aspect, the invention includes a system for powering a network element of a fiber optic network, such as a fiber to the premise (FTTP) network, which enables broadband communications between a CO and a subscriber or customer. The network element, such as an ONU or ONT, serves to convert signals from the optical domain of optical fiber coming to the network element from a CO to electrical signals on copper twisted pairs or that run between the network element and a subscriber gateway or customer premise equipment. The ONU or ONT is located at the subscriber or customer premise, specifically at the point of demarcation or network interface device (NID). Alternatively, the ONT can be located within the subscriber or customer premise (i.e. on the subscriber's side of the NID) when allowed by local regulation. While not shown in the following embodiments of the present invention, alternative embodiments with the ONT inside the subscriber's premise are possible and implied. The subscriber gateway or a remote user device further includes a Power over Ethernet (PoE) Power Sourcing Equipment (PSE) and an Ethernet Phy device. The PSE is coupled to two or four pairs of copper wires, such as in a category 5 cable, to the ONU or ONT at the NID. The ONU or ONT further includes a PoE Powered Device (PD) that accepts power from the PSE and powers the ONU or ONT. Additionally the ONU or ONT includes a second Ethernet Phy device enabling Ethernet communication between the subscriber gateway or remote user device and the ONU or ONT at the NID. In this way, the network element is powered by Power over Ethernet from a subscriber or customer premise. The subscriber gateway, customer premise equipment or remote user device may further include one or more of the following features for remote user use: an Ethernet local area network (LAN), a WiFi network, a Voice over IP (VoIP) service, or an IPTV service.

In general, in one aspect, the invention includes a system for powering a first network element of a fiber optic communication network, such as a hybrid fiber coax network, which transmits communication data between a head-end and a subscriber gateway or customer premise equipment. The first network element, such as a drop site, serves to convert optical to electrical (O-E) and electrical to optical (E-O) signals between a fiber from the head-end and coax cable to the subscriber gateway. The subscriber gateway or a remote user device further includes a DC power source, a high-speed client modem or client network device, and a first coupler that includes means for coupling the communications of the client modem or client network device to the DC power output of the DC power source. The network element further includes, a high-speed head-end modem or access network controller device, an DC-to-DC power converter, and a second coupler that includes means for coupling communications of the head-end modem or network access controller device and delivers DC power to the DC-to-DC power converter. A coax cable that is in electrical communication between the subscriber gateway and the network element serves as medium for DC power transfer to the network element and for network communications. In this way, the first network element is powered by the subscriber gateway over the coax cable and the modems or network devices are in communication over the same coax cable.

Aspects of the invention may include one or more of the following features. The modems, according to the invention, may be Data Over Cable Service Interface Specification (DOCSIS) modems. The modems may be Power Line, also called Power Line Communication or Power Line Carrier (PLC), modems. The network devices may also be Home-PNA, Multimedia over Coax Alliance (MoCA) or ITU G.hn capable devices. The first and second couplers may comprise coupling capacitors, coupling transformers, blocking inductors, or perform inductive coupling. Furthermore, the first and second couplers may include elements for low pass filtering, bandpass filtering, and/or high pass filtering. The first coupler will limit the current of the DC power to non-hazardous levels. The first network element that is powered by the subscriber maybe an optical node or simply node. The subscriber gateway, customer premise equipment or remote user device may further include one or more of the following features for remote user use: an Ethernet local area network (LAN), a WiFi network, a Voice over IP (VoIP) service, or an IPTV service. The subscriber gateway, customer premise equipment or remote user device my also provide Plain Old Telephone Service (POTS) and include a battery backup incase of subscriber main power loss to provide lifeline support. The battery may be user, customer or subscriber replaceable. The battery may also be located at the network element. The DC power supply at the subscriber or customer premise may be a DC-to-DC power supply or an AC-to-DC power supply. A second network element, such as a tap, may further contain a device that combines the power and communication from one or more coax cables from other subscribers or customer premises to the first network element or node. The first network element may be capable of being powered from the power received from a single subscriber or customer premise.

DETAILED DESCRIPTION

Figure 1A:
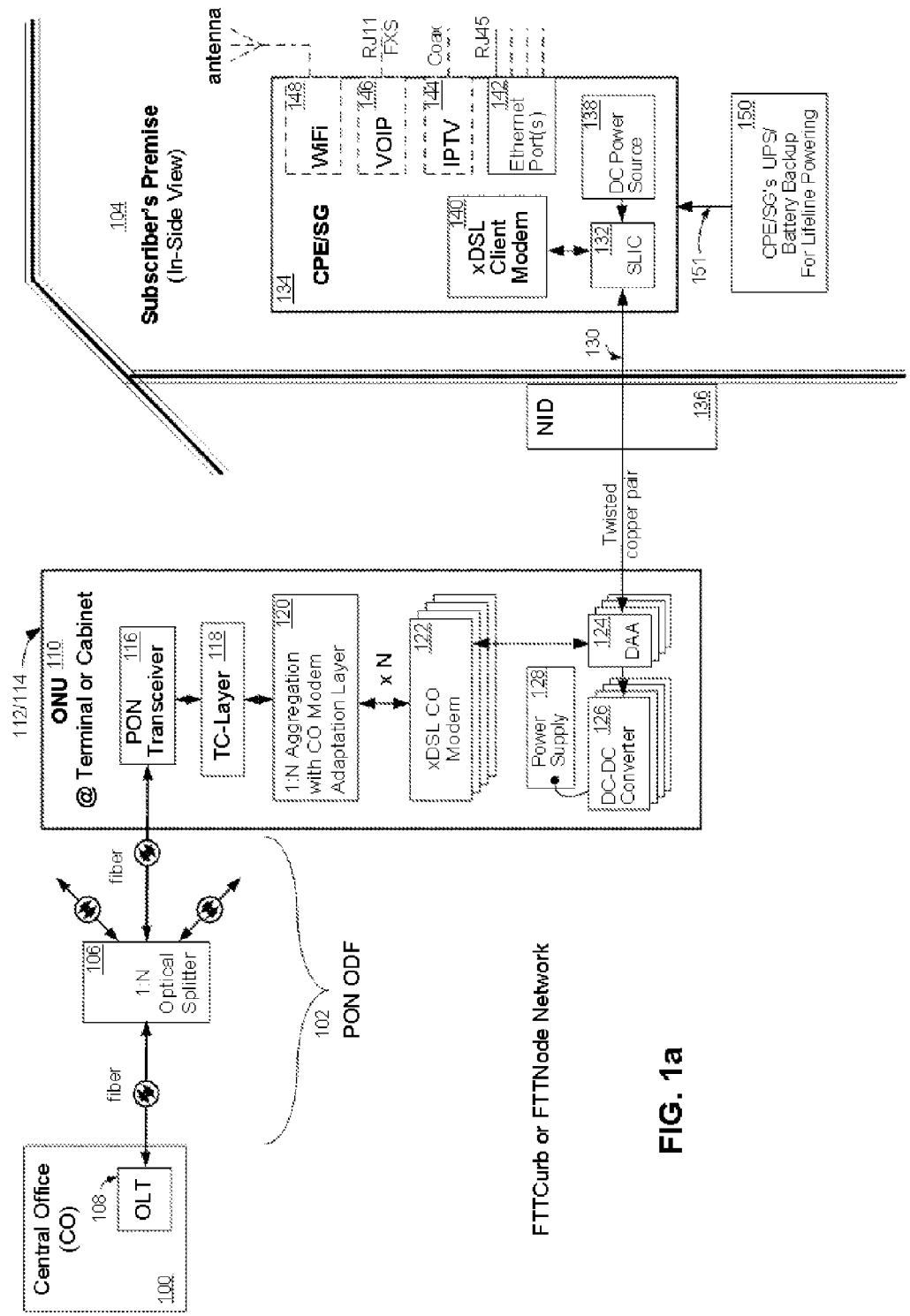
FIG. 1a is a block diagram illustration of a Fiber-to-the-Curb (FTTC) or Fiber-to-the-Node (FTTN) point-to-multipoint passive optical network (PON) with an ONU network element powered by a subscriber's customer premise equipment (CPE) or subscriber's gateway (SG) using a single twisted copper pair, in accordance with an embodiment of the present invention.

Referring now to FIG. 1a, wherein like reference numerals designate identical or corresponding parts throughout the several views and embodiments and wherein cascading boxes below a part designates a plurality of such parts, an exemplary embodiments of an electrical power architecture for a fiber optic communication network is shown incorporating a subscriber-powered network element, according to the present invention. A FTTC or FTTN network using a PON connects a central office (CO) 100 at the head end of a passive optical distribution fabric (ODF) 102 to a subscriber premise 104. The subscriber premise 104 can be residential homes and/or commercial buildings. The passive ODF 102 is comprised of a plurality of passive optical splitters 106 and connectors (not shown). An Optical Line Terminal (OLT) 108, which is located at the CO 100, acts as a central transmission point and an overall controlling device for the network. The OLT 108 is in communication through the ODF 102 with a plurality of Optical Network Units (ONUs) 110 located in neighborhood terminals (also called pedestals) in FTTC networks 112 or in cabinets in FTTN networks 114.

The OLT 108 transmits and receives data to and from the ONUs 110 in the form of modulated optical light signals of known wavelength through the ODF 102. The transmission mode of the data sent over the ODF 102 may be continuous, burst or both burst and continuous modes. The transmissions are be made in accordance with a time-division multiplexing scheme or similar protocol. Frequently bi-directional wavelength-division multiplexing (WDM) is used and although the FTTC/FTTN network illustrated in FIG. 1a includes an OLT 108 in communication with a plurality of ONUs using a plurality of fibers, other implementations of such networks may only use ONTs or some combination of ONUs 110 and ONTs 110. In some implementations, the ONUs and ONTs are generally similar. In other implementations, the ONUs and ONTs may differ in one or more aspects. As previously mentioned, the ONUs and ONTs are drop site network elements that generally serve to convert signals between the optical domain of a fiber and electrical domain of a twisted copper wire or possibly coax cable. Although in the hybrid fiber coax network case, ONUs/ONTs are called nodes or even taps depending on where the fiber network ends and the coax cable network begins.

Referring again to FIG. 1a, an exemplary embodiment of an ONU 110 is comprised of the following functional blocks: a PON transceiver 116, a PON client Transconvergence Layer (TC-Layer) device 118; a CO modem aggregation and adaptation layer device 120; a plurality of Digital Subscriber Line (xDSL, i.e. ADSL VDSL or VDSL2) modems 122; a plurality of Digital Access Arrangement (DAA) devices 124; a plurality of DC-to-DC power converters 126, and a power supply 128.

The client PON transceiver 116 comprises the necessary components to convert optical to electrical communications from the OLT 108 as well as convert electrical to optical signals and communicate them to the OLT 108. The PON transceiver 116 communicates electrically with the TC-Layer 118. The TC-Layer 118 comprises of the functionality of: bundling and sending data into packets or frames; un-bundling and receiving data into packets or frames; managing the transmission of packets or frames on the network via medium access and bandwidth allocation protocols; providing necessary messaging and end point behavior, and checks and corrects for errors. The TC-Layer 118 communicates with both the PON transceiver 116 and a 1:N aggregation and CO modem adaptation layer 120.

The 1:N aggregation and CO modem adaptation layer 120 has several functions. Modem communications over copper have lower bandwidth rates than communications over fiber thus to efficiently use the higher bandwidth rates of the fiber, the communications from multiple modems are pooled together. Thus modem communications from as many as one to some N number, for the purposes of this disclosure, are aggregated together. In an exemplary implementation, some 96 modems can be aggregated together. The 1:N aggregation and CO modem adaptation layer 120 communications electrically to an N number of modems. Each modem serving to enable communications to a unique subscriber premise 104 over a unique twisted copper pair 130.

xDSL capable modems 122 are chosen as the preferred modem types however it is envisioned that many types of modems can be used for communications over copper wire or even coax cable to a subscriber premise 104. The xDSL capable modems of 122 are central office (CO) or head-end type modems. Each modem is in electrical communication with a DAA 124 and the DAA 124 is coupled to a twisted copper wire pair 130.

A DAA 124 is a mandatory interface that protects electronics connected to a telecommunication network from local-loop disturbances and vice versa. A DAA in general can mean many things because a DAA must perform varied and complex functions, including line termination, isolation, hybrid functions, and ring detection. A DAA must also provide a loop switch so that the DAA looks on-or off-hook to the loop; detect the state of the line and the incoming ringing signal, as well as include support of full-duplex operation. The International Telecommunication Union Telecommunication Standardization Sector (ITU-T) series G specification for transmission systems and media, digital systems and networks contains many documents, recommendations and specifications regarding DAA, as well as subscriber line interface circuits (SLIC) 132, specifically ITU-T G.100-109 specifications that are hereby included by reference.

For the purpose and needs of the present invention, the DAA 124 is a device that: meets local regulatory requirements which differ by country; provides a measure of protection for both a network element, such as ONU 110, and the local-loop; passes AC and/or DC based signal information to and from a modem, such as xDSL CO modem 122, as well as passes DC power (DC current and DC voltage) to a DC-to-DC power converter 126 from a twisted copper wire pair 130. Additionally, the DAA 124 provides isolation protection to the modem from the higher voltage on the twist copper wire pair 130. The DAA 124 device may be of a design that is transformer-based, optically-based, capacitively coupled-based, silicon/integrated circuit-based, or some combination thereof which offer virtues in size, cost, and performance.

As previously mentioned or indicated, the ONU 110 can provide broadband services to a plurality of subscriber premises 104 over twisted copper wire pairs. Located in each subscribe premise 104 is a customer premise equipment (CPE) or subscriber gateway (SG) device 134 which is connected to the twisted copper wire pair 130. The twisted copper wire pair 130 passes through the demarcation point or network interface device (NID) 136 to the CPE or SG 134.

The CPE/SG 134 device is powered by a subscriber's residential or commercial power outlet (not shown). The CPE/SG 134 is comprised of the functional blocks: a DC power source 138; an xDSL client modem 140; a subscriber line interface circuit (SLIC) 132; one or more Ethernet ports 142 with appropriate media access (MAC) and PHYs for operation with a subscriber's local area network (LAN); optionally an Internet Protocol Television (IPTV) codec and driver 144; optionally a Voice Over IP (VoIP) codec and driver 146, and optionally an IEEE 802.11x (WiFi) transceiver 148.

The DC Power source 138 may be from or be part of a DC-to-DC power supply or an AC-to-DC power supply. The DC Power source 138 provides DC power (DC current and DC voltage) to the SLIC 132.

Generally, SLICs provide the necessary signals, timing, and control functions for the plain old telephone system (POTS) line. SLICs and DAAs perform complementary functions with some overlap. The requisite functions of these devices, although similar at first look, differ enough that implementing the technologies requires different techniques. For example, SLICs act as power drivers as they send ringing signals down the line and supply loop power, generally from batteries, to the far end of the line. DAAs, on the other hand, act more like receivers and use the supplied loop power.

For the purpose and needs of the present invention, the SLIC 132 is a device that: meets local regulatory requirements which differ by country; provides a measure of protection for both a network element, such as ONU 110, and the CPE/SG 104; passes AC and/or DC based signal information to and from a modem, such as xDSL client modem 140; accepts DC power (DC current and DC voltage) from a DC power source, such as 138, and acts as a power driver driving the accepted DC power down a twisted copper wire pair, such as 130. The SLIC 132 device may be of a design that is transformer-based, optically-based, capacitively coupled-based, silicon/integrated circuit-based, or some combination thereof which offer virtues in size, cost, and performance.

The xDSL client modem 140 is a complementary modem to the xDSL CO modem 122 and as previously indicated is in electrical signal communication with the SLIC 132. With broadband communications established with the CO 100 and with the optional IPTV 144, VoIP 146, and WiFi 148 components the CPE/SG 134 is enabled to provide television subscription or pay-per-view services, VoIP services and wireless LAN capabilities, respectively.

VoIP service can be used as the primary telephony line service to a subscriber. Primary line means the telephone service will be available all the time, even during a significant power event. In the case where a subscriber suffers a power outage, then the CPE/SG 134 will require a battery or uninterruptible power source 150 to meet lifeline service requirements, according to an embodiment of the invention.

Figure 1B:
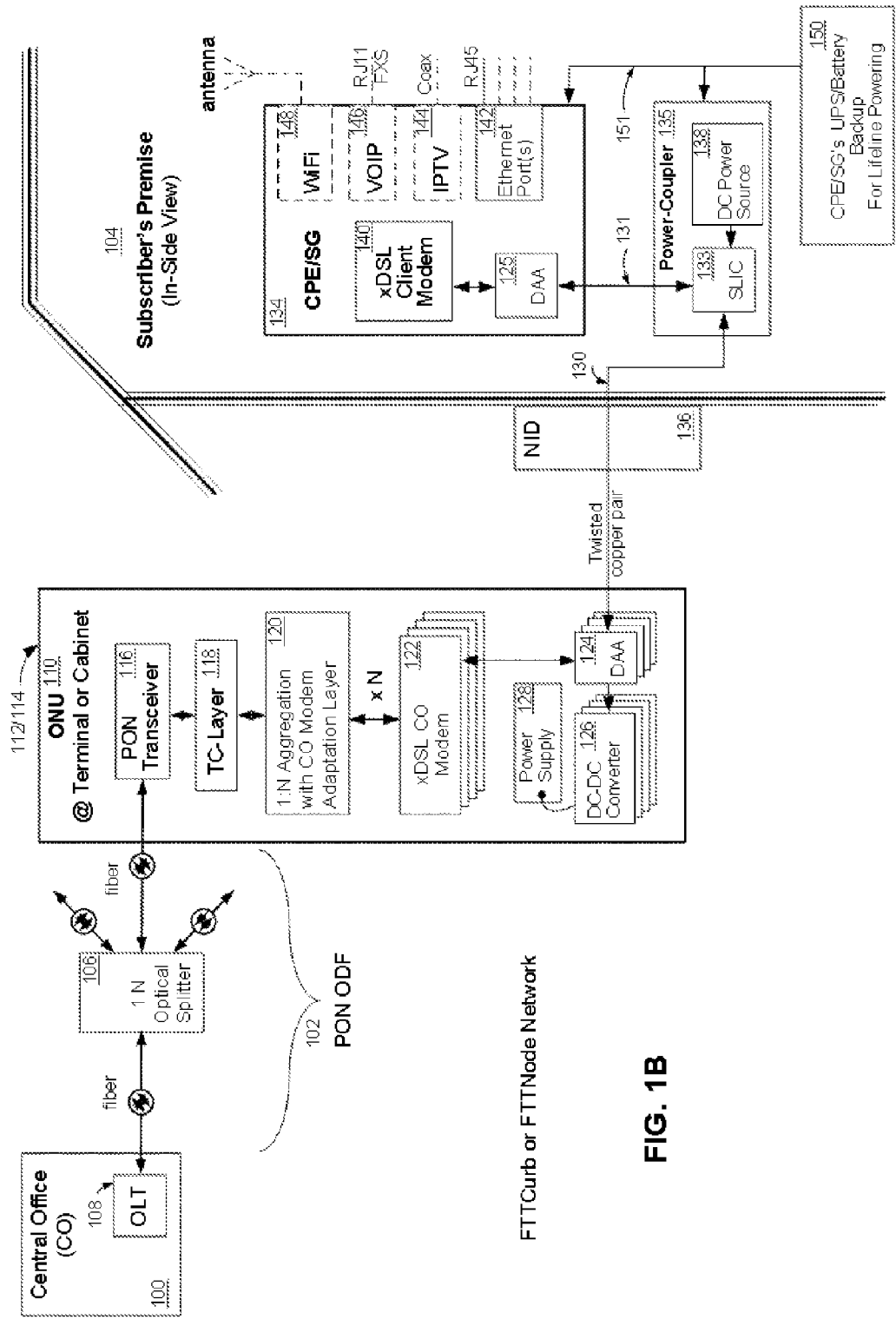
FIG. 1b is a block diagram illustration of a Fiber-to-the-Curb (FTTC) or Fiber-to-the-Node (FTTN) point-to-multipoint passive optical network (PON) with an ONU network element powered by a subscriber's power-coupler device using a single twisted copper pair, in accordance with an embodiment of the present invention.

Referring to FIG. 1b, an alternative embodiment of FIG. 1a is shown with an external power-coupler 135 comprising SLIC 133 and DC Power source 138. SLIC 133 operates similar to SLIC 132, coupling DC power from DC power source 138 onto twisted cooper pair wires 130 with electrical signal communications from xDSL client modem 140 via twisted copper wire pair 131. SLIC 133 also decouples electrical signal communications from xDSL CO modem 122 on twisted copper wire pair 130 onto twisted wire pair 131. In the case where a subscriber suffers a power outage, then the CPE/SG 134 and power-coupler 135 will require a battery or uninterruptible power source 150 to meet lifeline service requirements, according to an embodiment of the invention.

Figure 2:
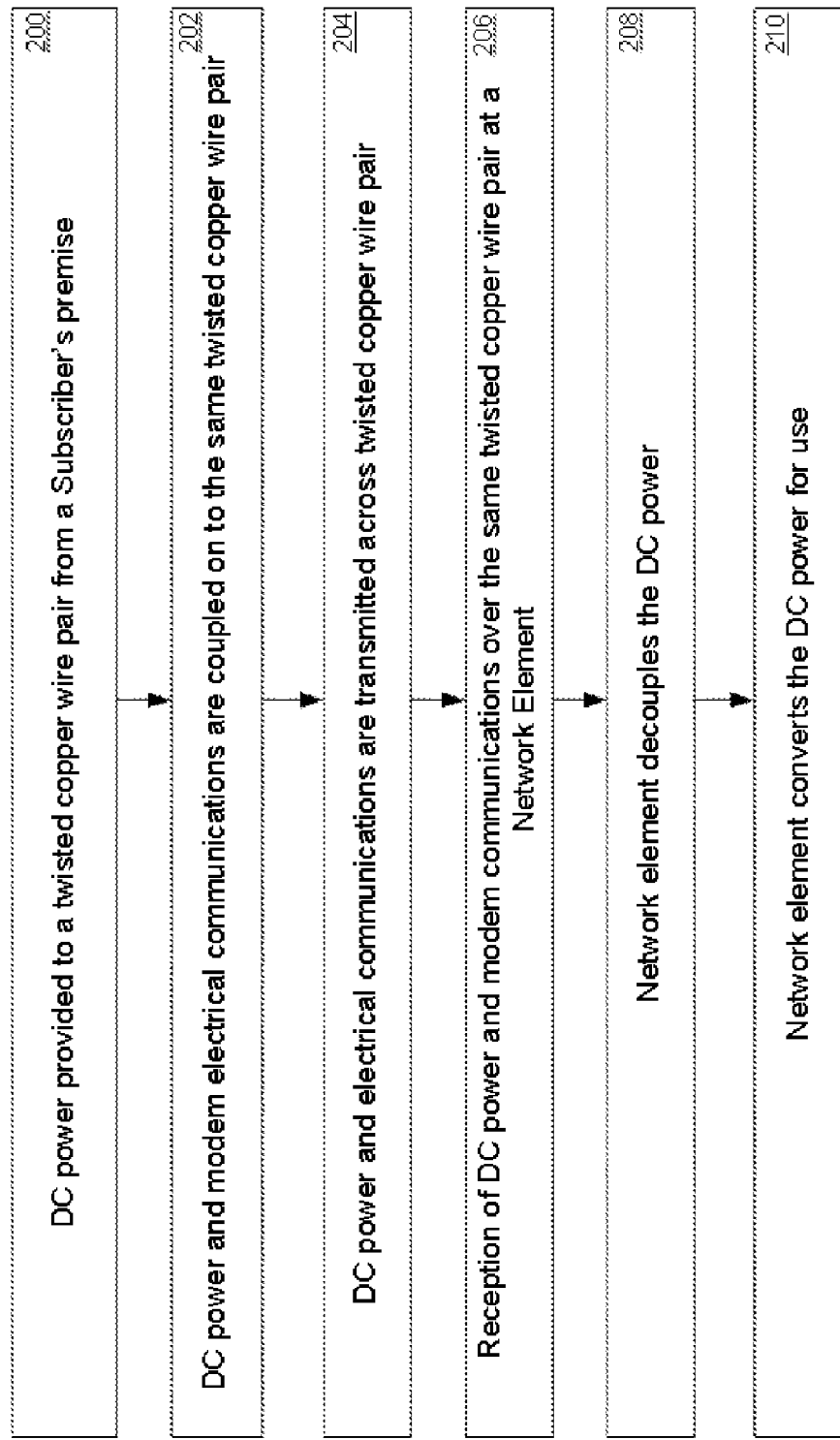
FIG. 2 is a flow chart illustration of a method of the present invention for powering a network element with twisted copper pair wires.

Referring to FIG. 2 in view of FIG. 1a, a flow chart of a method of the present invention illustrated. Powering a network element of a fiber optic communication network, such as on ONU 110 in FIG. 1a, from a subscriber's premise 104 entails providing or supplying a DC power 138 to a twisted copper wire pair 130 as described at block 200. At block 202, electrical communications from a modem, as in a client modem 140, are coupled to same twisted copper wire pair 130 with the DC power. At block 204, the DC power and modem electrical communications are transmitted, driven or sent across the twisted copper wire pair 130 from the subscriber premise 104 to the network element, such as ONU 110. At block 206, the driven DC power and modem electrical communications are received at the network element over the same twisted copper wire pair 130. At block 208, the network element decouples the modem electrical communications from the DC power, or vice versa, with a DAA device 124. At block 210, the network element provides the DC power to a DC-to-DC power converter 126 for conversion for use by the network element in the network element's power supply 128. In the method described above, the power network and the information network become, and are, the same network. The DC power that is provided or supplied at the subscriber premise 104 for feeding the power need of the network element is assumed to be of sufficient DC current and DC voltage required for delivery to the network element. In many embodiments of the invention, this required DC current and DC voltage will be of a high level that necessitates the use of a DC converter by the network element to convert the delivered DC power to a usable level for use by the network element.

In alternate embodiments of the invention, such as those providing primary telephony line service without the use of a traditional POTS line, an uninterruptible power source or battery backup 150 device is required to continue to meet lifeline telephony regulatory obligations.

It will be appreciated that according to the method of the invention as described above, that with an increasing number of active subscribers the power needs of the network element, such as ONU 110, increases and so does the amount of supplied DC power with each active subscriber. The method provides a solution to match increasing power demands with increasing power supply in a progressive manner.

Figure 3:
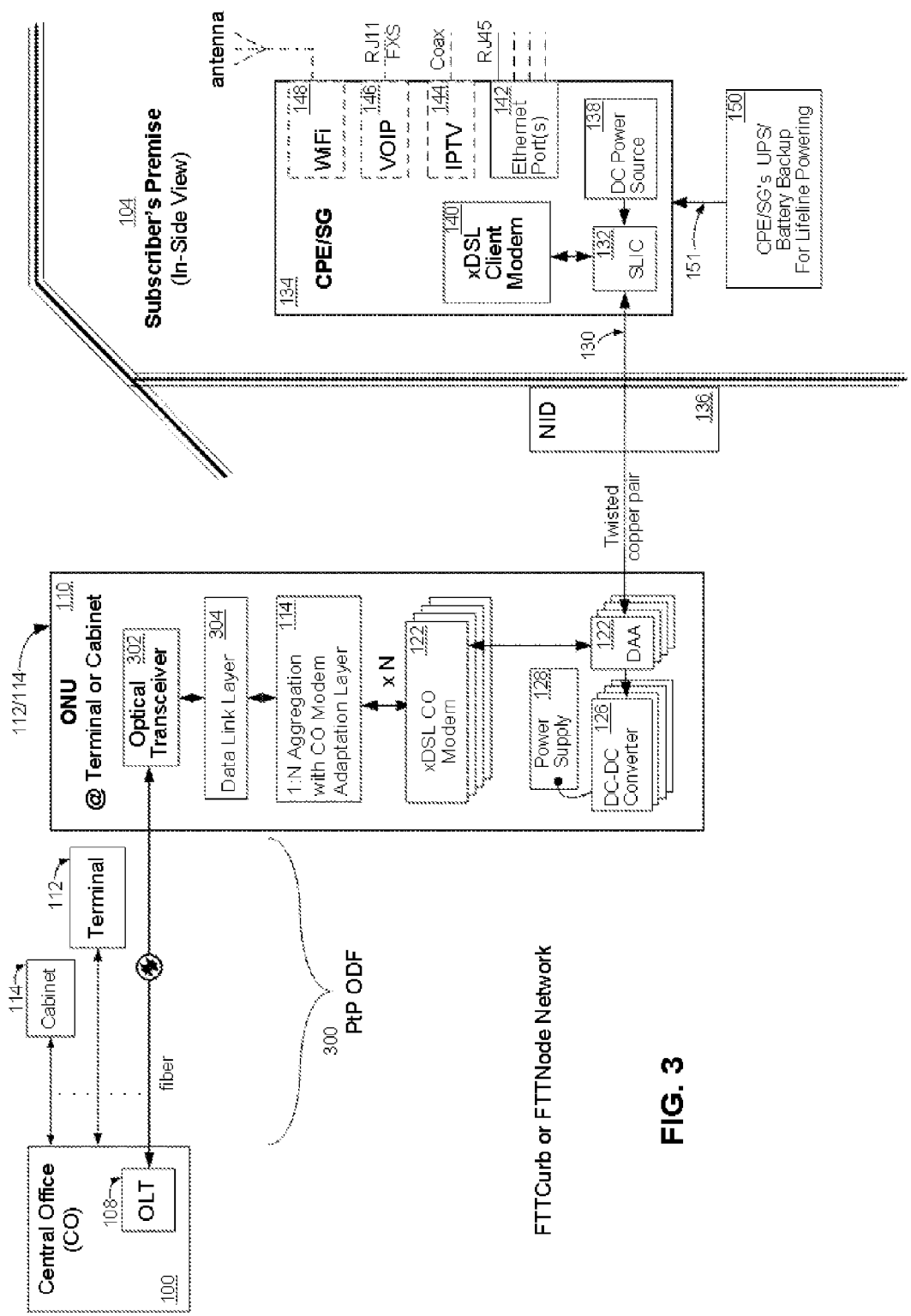
FIG. 3 is a block diagram illustration of a FTTC or FTTN point-to-point (PtP) optical network with an ONU network element powered by a subscriber's CPE or SG using a single twisted copper pair, in accordance with an embodiment of the present invention.

Referring to FIG. 3, a FTTC or FTTN network is shown wherein the implementation of the network is a point-to-point (PtP) fiber optic network. The ODF 300 lacks passive splitters and illustrates the one-to-one direct connection between terminals 112 and cabinets 114 and the CO 100. Such PtP networks may be implemented by a point-to-point gigabit Ethernet network with complementary components such as optical transceiver 302 and data link layer 304 in accordance with whatever specific protocol is chosen for the network implementation. FIG. 3 serves to show that the method of the invention as previously described, as in FIG. 2, is a method apathetic and even naive of the design choice or implementation of the fiber in the loop network. The method works equally well for both PtP and PON networks.

Figure 4:
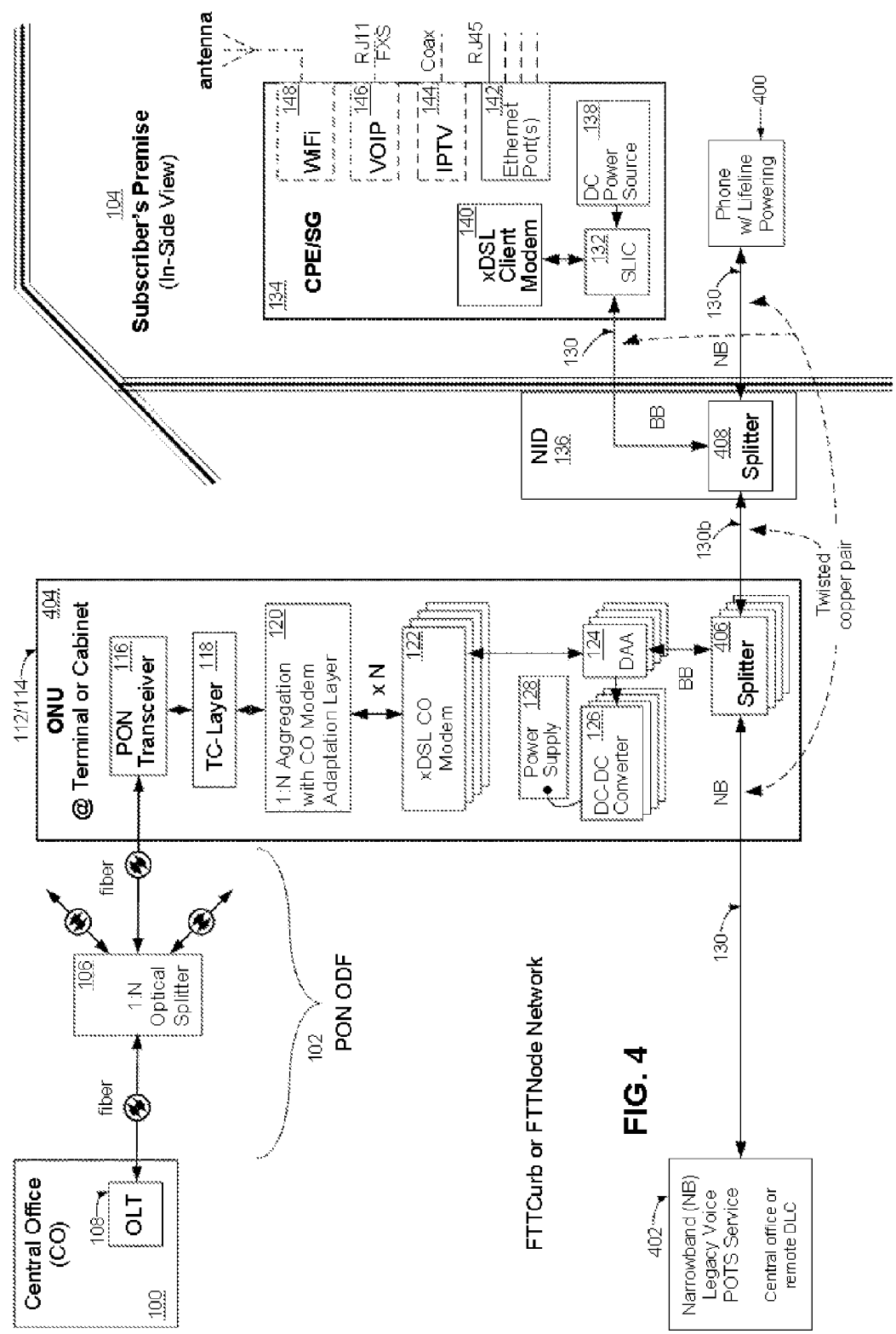
FIG. 4 is a block diagram illustration of a FTTC or FTTN point-to-multipoint PON with an ONU network element powered by a subscriber's CPE or SG using a single twisted copper pair while CO provides Lifeline powering across same twisted copper pair, in accordance with an embodiment of the present invention.

Referring to FIG. 4, an alternative embodiment in accordance with the present invention is illustrated wherein the primary telephony line service 400 is served by legacy POTS from a CO or remote Digital Loop Carrier (DLC) network 402. Traditionally, a CO or DLC 402 powers legacy POTS lines, however in this embodiment the SLIC 132 provides the DC power to twisted copper wire pair 130. Twisted copper wire pair line 130 is connected to the CO or DLC 402 to a network element, such as ONU 404. ONU 404 additionally comprises a splitter 406 that combines the POTS service with the electrical CO modem 122 communications together on the same twisted copper wire pair 130. The splitter 406 places the POTS service at a lower and more narrow frequency (termed narrowband NB) than the xDSL modem communications which utilize higher frequencies to achieve greater bandwidth for data communications (termed broadband BB).

In this embodiment a section of the twisted copper wire pair 130b contains both POTS (NB), xDSL modem electrical communications (BB) and the DC power (both a DC current and a DC power). This section of twisted copper wire pair 130b lies between and connects the ONU 404 to the NID 136 of a subscriber premise 104. At the NID 136, another splitter 408 filters or separates the POTS NB signal and the xDSL modem electrical communications BB providing the NB signal to connect the subscriber's primary telephone line service 400 and providing the BB signal to the SLIC 132.

It will be appreciated that in this embodiment of the invention a UPS or battery backup source is not required. If a subscriber suffers a power outage, the CPE/SG 134 will be without power and thus broadband communications will be down as well. This is tolerable since the outage will cause powered equipment such as TVs and the subscriber's LAN to be down as well. The CPE/SG 134 will not be able to provide DC power to the twisted copper wire pair. The CO or DLC 402 routinely monitors conditions on the twisted copper wire pair line and sensing a loss of power on the line can provide the necessary DC power to continue providing POTS services such as primary telephony line service 400.

Figure 5:
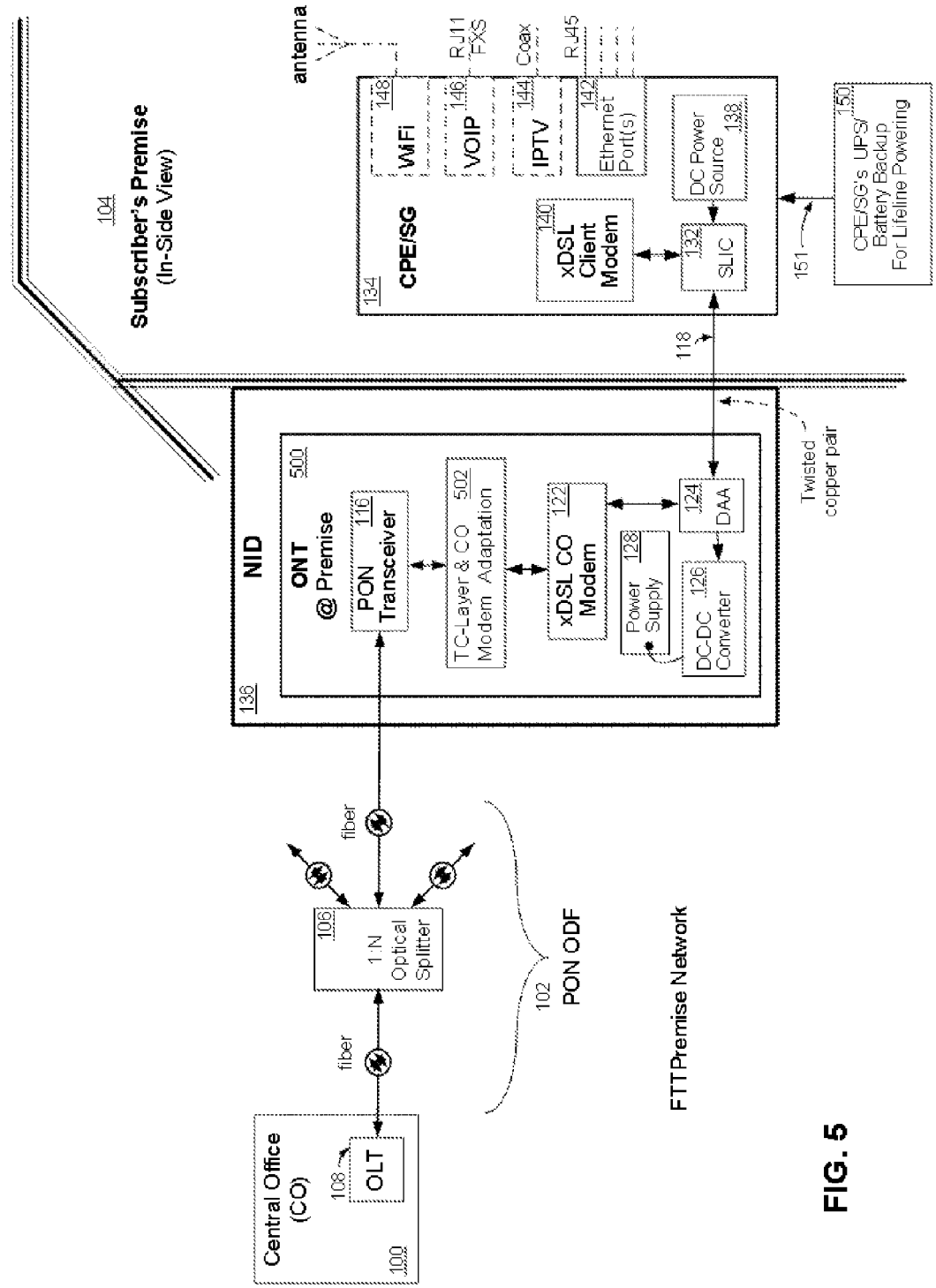
FIG. 5 is a block diagram illustration of a Fiber-to-the-Premise (FTTP) point-to-multipoint PON with an ONT network element powered by a subscriber's CPE or SG using a single twisted copper pair, in accordance with an embodiment of the present invention.

Referring to FIG. 5, in which another alternative embodiment in accordance with the present invention is illustrated wherein the fiber in the loop network is a FTTP or Fiber to the Home (FTTH) network and the subscriber-powered network element is an ONT 500 in or near the NID 136. The ONT 500 does not support multiple premises thus aggregation methods are not necessary in the TC-Layer and CO modem adaptation device 502 and only a single DAA 124, xDSL CO modem 122 and DC-to-DC converter 126 are required to perform a method of the invention. The FTTP or FTTH network illustrated in FIG. 5 is a passive optical network (PON). If primary telephone service line is to be provided by the FTTP or FTTH network then a UPS/battery backup source 150 for the CPE/SG 134 may be required for regulatory obligations.

Figure 6:
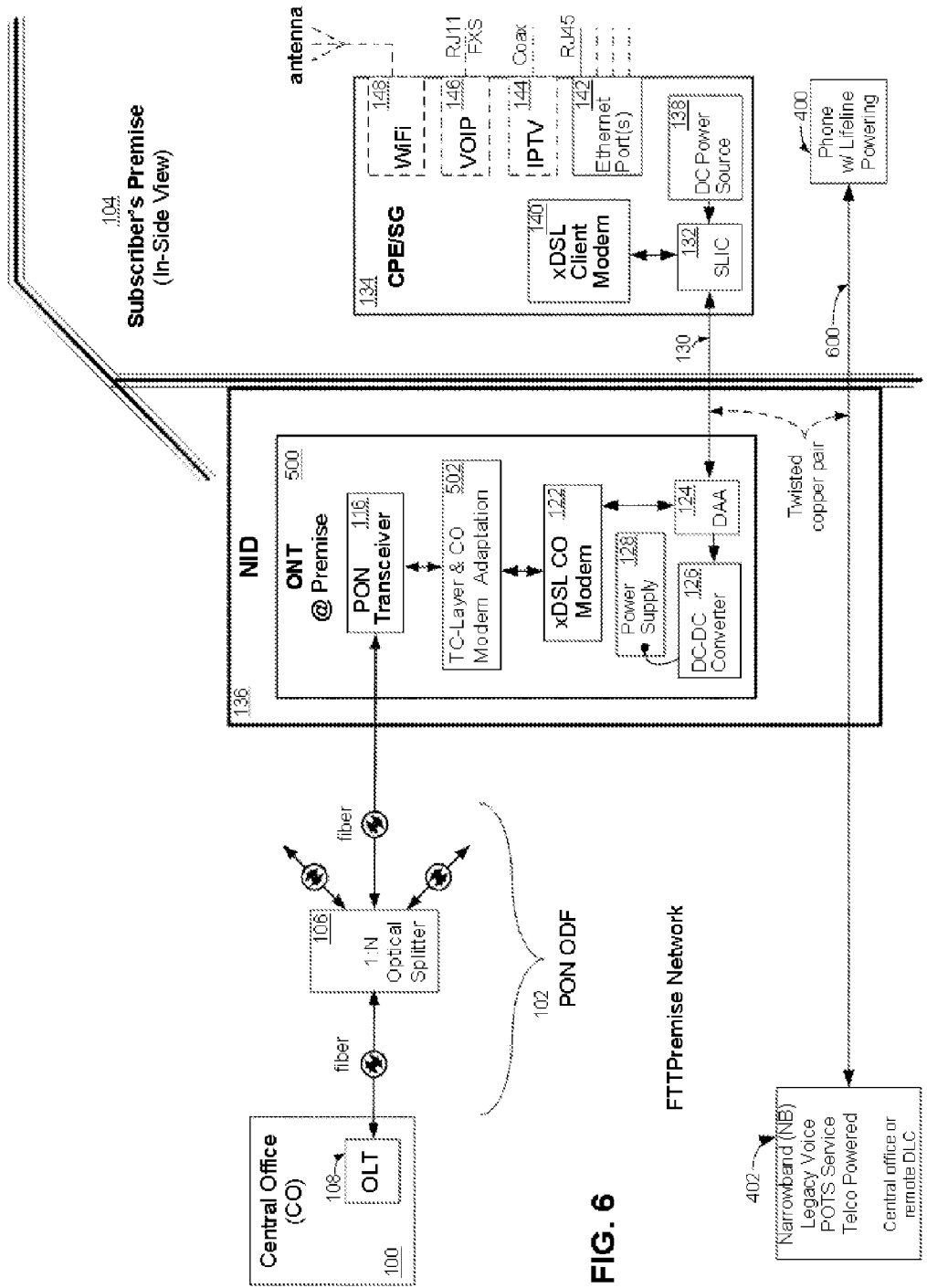
FIG. 6 is a block diagram illustration of a FTTP point-to-multipoint PON with an ONT network element powered by a subscriber's CPE or SG using a single twisted copper pair with the CO providing Lifeline powering for Plain Old Telephone Service (POTS) using a second twisted copper pair, in accordance with an embodiment of the present invention.

Referring to FIG. 6, in which yet another alternative embodiment in accordance with the present invention is illustrated wherein the FTTP or FTTH does not provide a primary telephone service line. In this embodiment the POTS services provided by a CO or DLC 402 pass through the NID 136 with no splitting and on a separate twisted copper wire pair 600 from the twisted copper wire pair 130 which provides broadband services to the subscriber premise 104 and provides subscriber power to the ONT 500 as previously described and indicated.

Figure 7A:
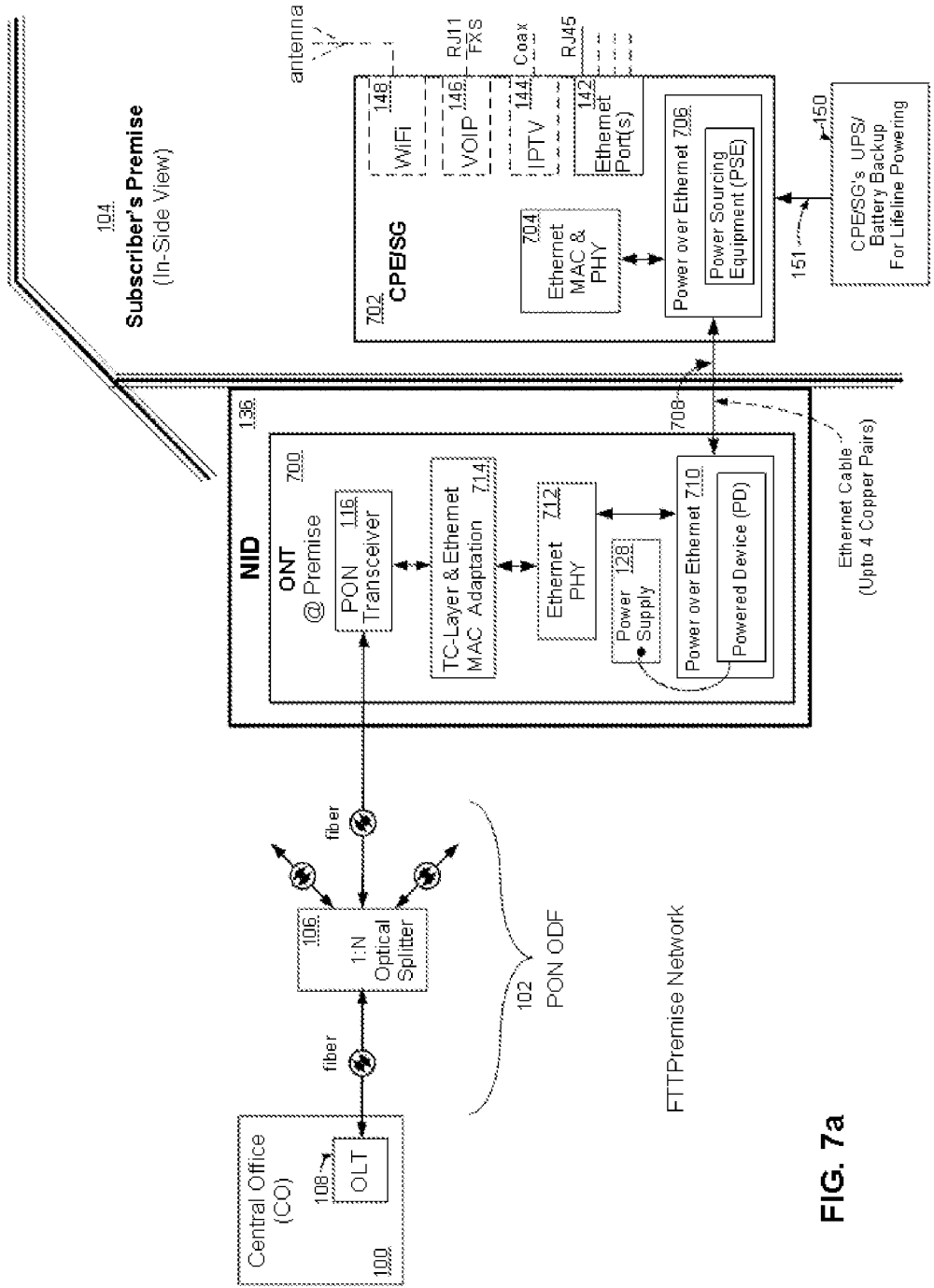
FIG. 7a is a block diagram illustration of a FTTP point-to-multipoint PON with an ONT network element powered by a subscriber's CPE or SG using Power over Ethernet (PoE) over a single Ethernet cable, in accordance with an embodiment of the present invention.

Referring to FIG. 7a, an alternative embodiment of the invention in accordance with the present invention is illustrated wherein a FTTP or FTTH network is shown with a subscriber-powered ONT 700, which is powered by Power over Ethernet (PoE). The FTTP or FTTH network shown being a passive optical network (PON) implementation. PoE is defined by the IEEE 802.af specification (hereby included by reference) and defines a way to build Ethernet power-sourcing equipment and powered terminals. The specification involves delivering 48 volts of DC power over unshielded twisted-pair wiring. It works with existing cable plant, including Category 3, 5, 5e or 6; horizontal and patch cables; patch-panels; outlets; and connecting hardware, without requiring modification.

A CPE/SG 702 comprising an Ethernet MAC and PHY 704 device is in electrical communication with a first Power over Ethernet (PoE) capable device 706. The PoE capable device 706 may internally comprise a Power Sourcing Equipment (PSE) device. The first PoE capable device 706 passes Ethernet electrical signals as well as DC power over Ethernet cable 708 to a second PoE capable device 710 in the ONT 700. The ONT 700 being in or near the NID 136. The second PoE capable device 710 may comprise a Powered Device (PD) in accordance with the 802.3af standard. The second PoE capable device 710 is capable of decoupling the Ethernet electrical signals, which are then provided to the Ethernet PHY 712 and provide the driven DC power to the ONT 700 power supply 128. The second PoE capable device 710 may contain a DC-to-DC converter to supply (not shown) the appropriate DC current and DC voltage needs of the ONT 700. The Ethernet PHY 712 is in electrical communication with a TC-Layer and Ethernet MAC adaptation device 714 to complete the broadband communication flow and to indicate the differences in ONT 700 over previous ONT 500. The CPE/SG 702 is provided power during subscriber power outages by a UPS/battery backup 150 for lifeline powering requirements.

Figure 7B:
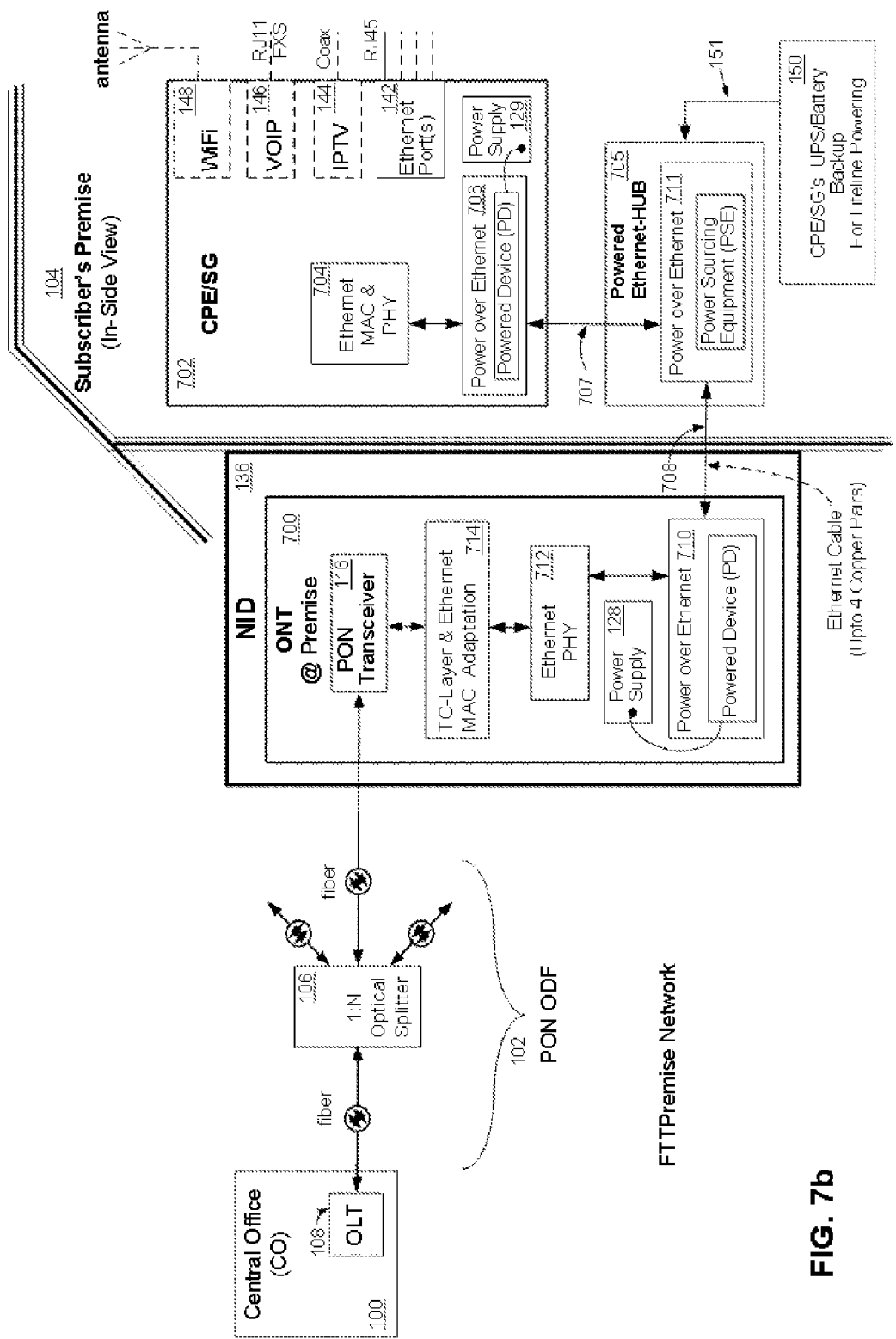
FIG. 7b is a block diagram illustration of a FTTP point-to-multipoint PON with an ONT network element and a CPE/SG powered by a Powered Ethernet-Hub using Power over Ethernet (PoE) over a single Ethernet cable, in accordance with an embodiment of the present invention.

Referring to FIG. 7b, an alternative embodiment of FIG. 7a is shown with a Powered Ethernet-Hub 705 comprising PoE capable device(s) 711. The Powered Ethernet-Hub 705 passes Ethernet electrical signals between CPE/SG 702 and ONT 700 via Ethernet cables 707 and 708 respectively as well as providing DC power. Powered Ethernet-Hub 705 is provided power during subscriber power outages by the UPS/battery backup 150 for lifeline powering requirements.

Figure 7C:
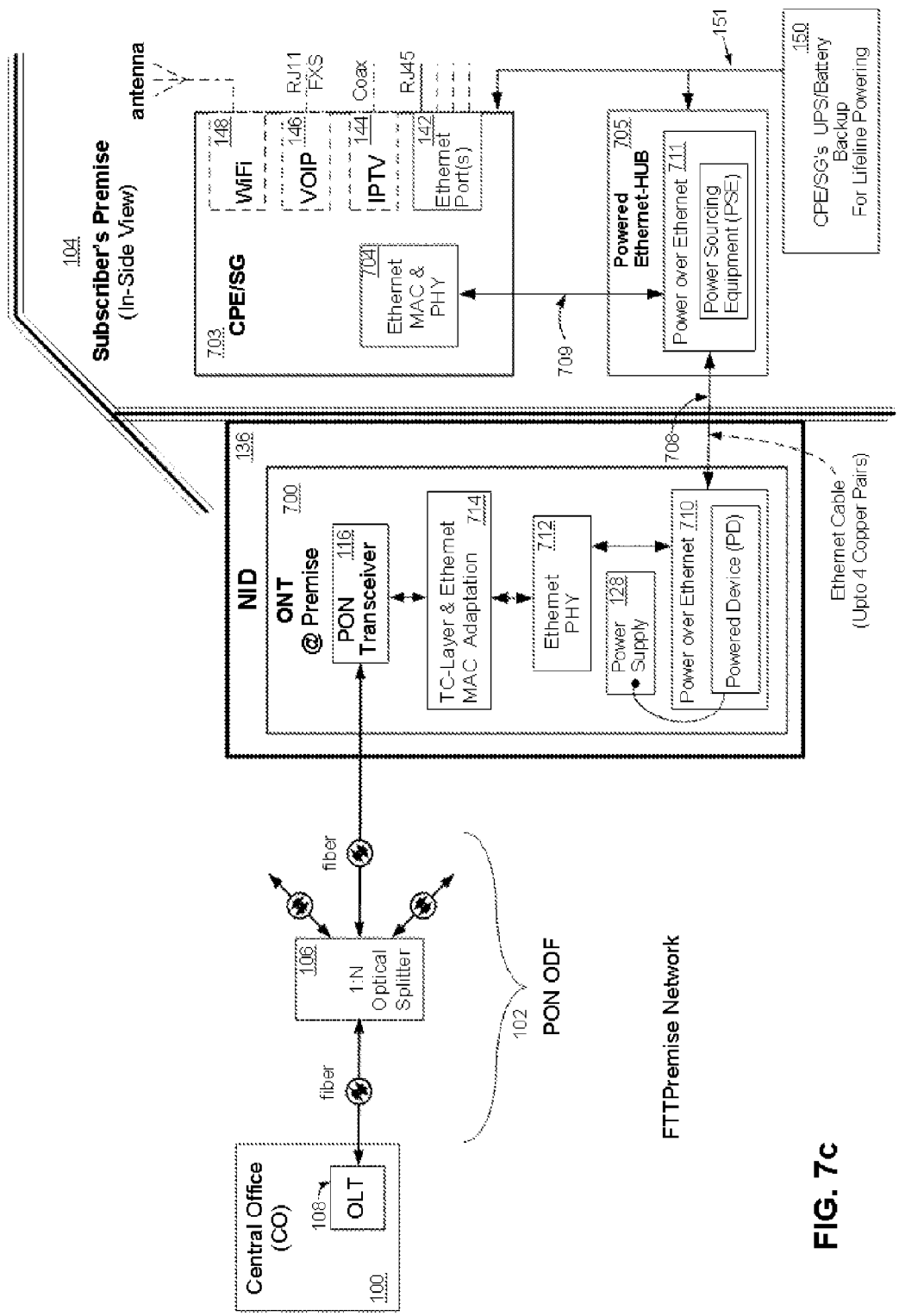
FIG. 7c is a block diagram illustration of a FTTP point-to-multipoint PON with an ONT network element powered a Powered Ethernet-Hub using Power over Ethernet (PoE) over a single Ethernet cable, in accordance with an embodiment of the present invention.

Referring to FIG. 7c, an alternative embodiment of FIG. 7b is shown with a legacy CPE/SG 703 that is not PoE capable. PoE capable device 711 passes Ethernet electrical signals from Ethernet MAC and PHY 704 via Ethernet cable 709 as well as DC power over Ethernet cable 708 to the second PoE capable device 710 in ONT 700. The CPE/SG 703 and Powered Ethernet-Hub 705 are provided power during subscriber power outages by the UPS/battery backup 150 for lifeline powering requirements.

Figure 8:
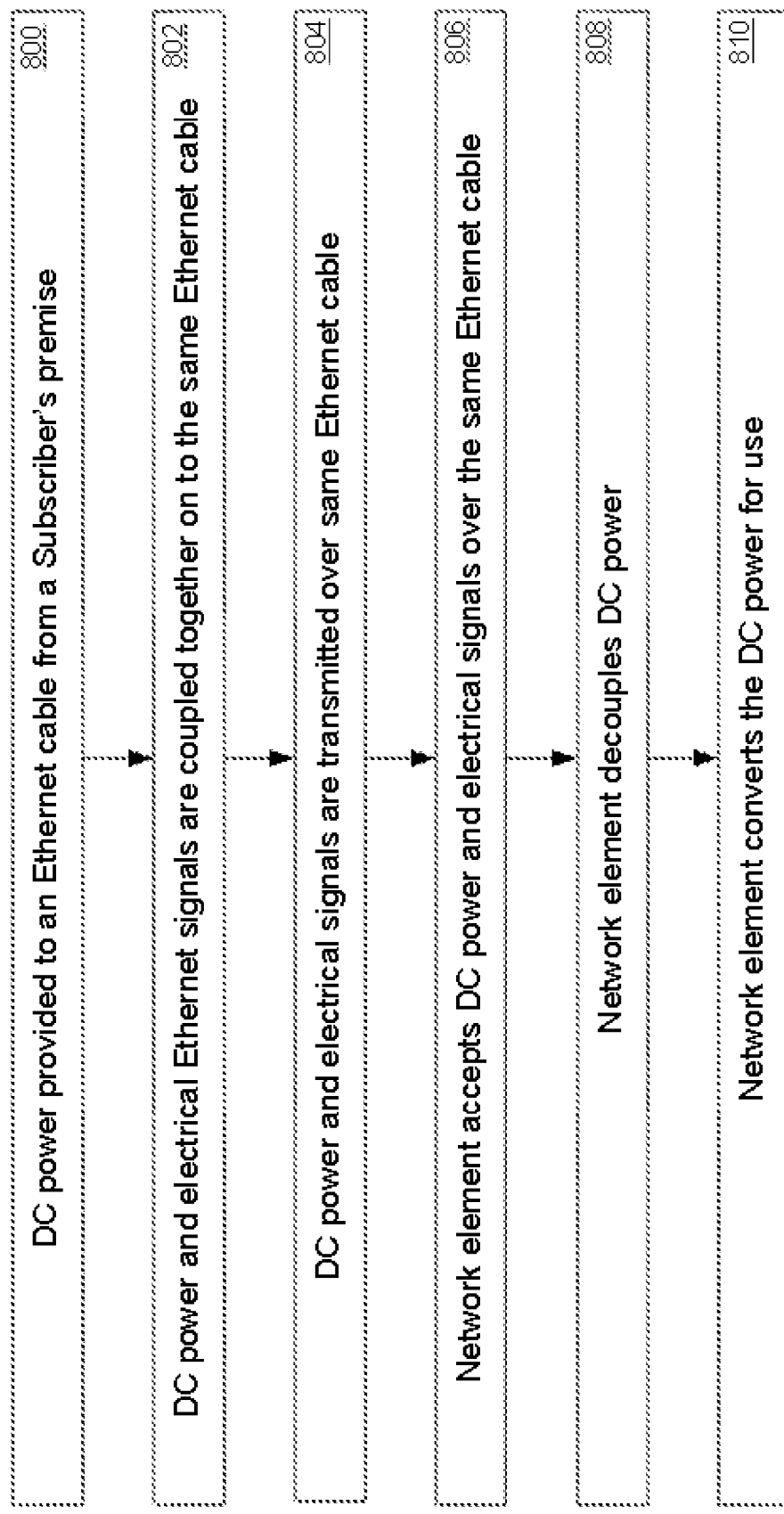
FIG. 8 is a flow chart illustration of a method of the present invention for powering a network element utilizing Power over Ethernet (PoE).

Referring to FIG. 8 in view of FIG. 7a, a flow chart of a method of the present invention utilizing PoE is illustrated. Powering a network element of a FTTP or FTTH network, such as ONT 700 in FIG. 7a, from a subscriber's premise 104 entails providing or supplying a DC power 706 to a twisted copper wire pairs or Ethernet cable 708 from a subscriber premise as indicated by block 800. At block 802, electrical Ethernet communications or signals from the Ethernet MAC and PHY device 704 are coupled to the same Ethernet cable 708 with the DC power. At block 804, the DC power and electrical Ethernet signals are transmitted, driven or sent across the Ethernet cable 708 from the subscriber premise 104 to the network element, such as ONT 700. At block 806, the driven DC power and electrical Ethernet signals are accepted or received at the network element over the same Ethernet cable 708. At block 808, the network element decouples the electrical Ethernet signals from the DC power, or vice versa with the second PoE capable device 710. At block 810, the network element performs DC-to-DC power conversion for use by the network element.

Figure 9:
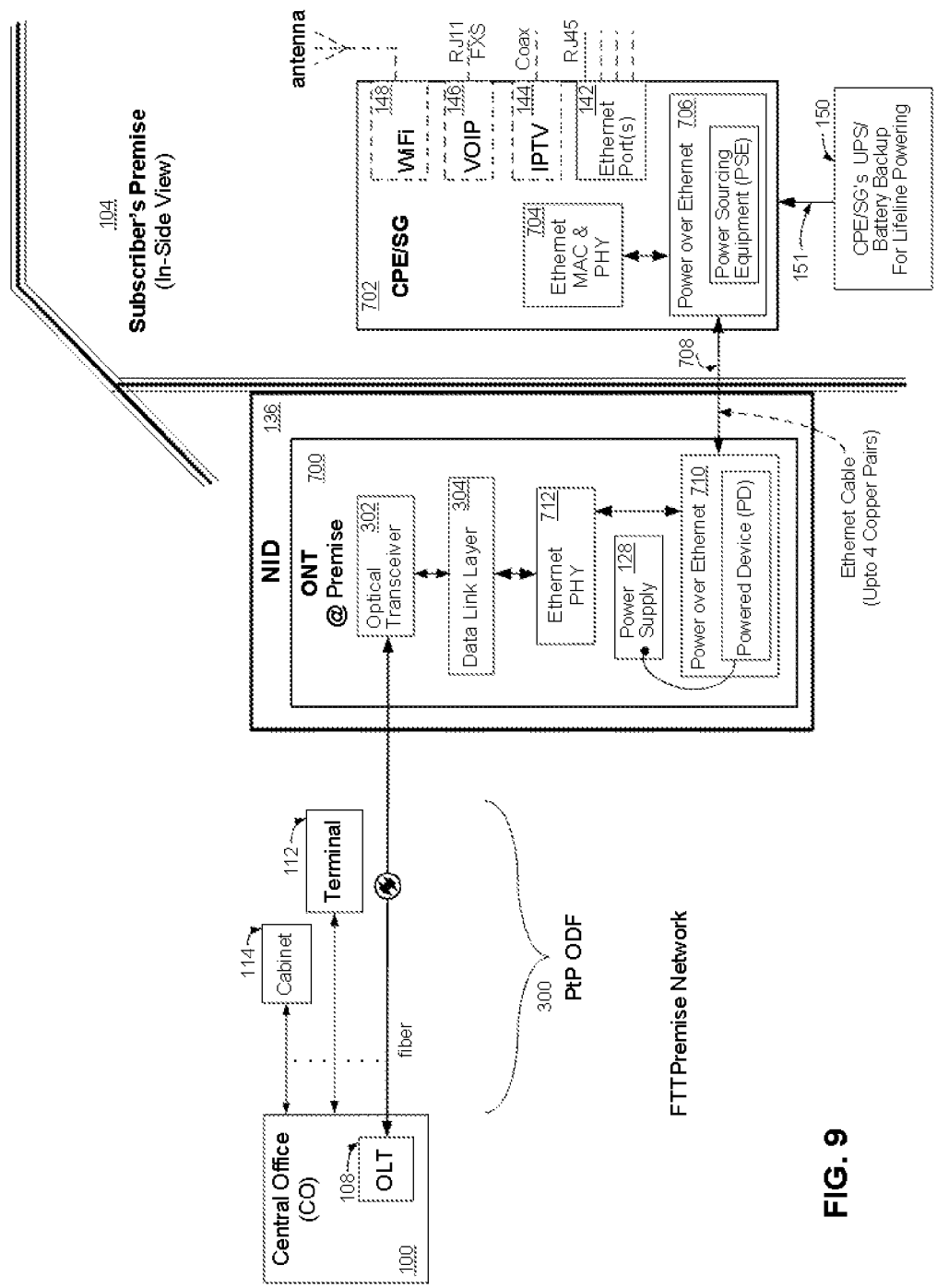
FIG. 9 is a block diagram illustration of a FTTP point-to-point optical network with an ONT network element powered by subscriber's CPE or SG using Power over Ethernet (PoE) over a single Ethernet cable, in accordance with an embodiment of the present invention.

Referring to FIG. 9, a FTTP or FTTH network is shown wherein the implementation of the network is a point-to-point (PtP) fiber optic network. The ODF 300 lacks passive splitters and illustrates the one-to-one direct connection between terminals 112, cabinets 114, NIDs 136 and the CO 100. Such PtP networks may be implemented by a point-to-point gigabit Ethernet network with complementary components such as optical transceiver 302 and data link layer 304 in accordance with whatever specific protocol is chosen for the network implementation. FIG. 9 serves to show that the PoE method of the invention as previously described, as in FIG. 8, is a method apathetic and even naive of the design choice or implementation of the fiber in the loop network. The method works equally well for both PtP and PON networks.

Figure 10:
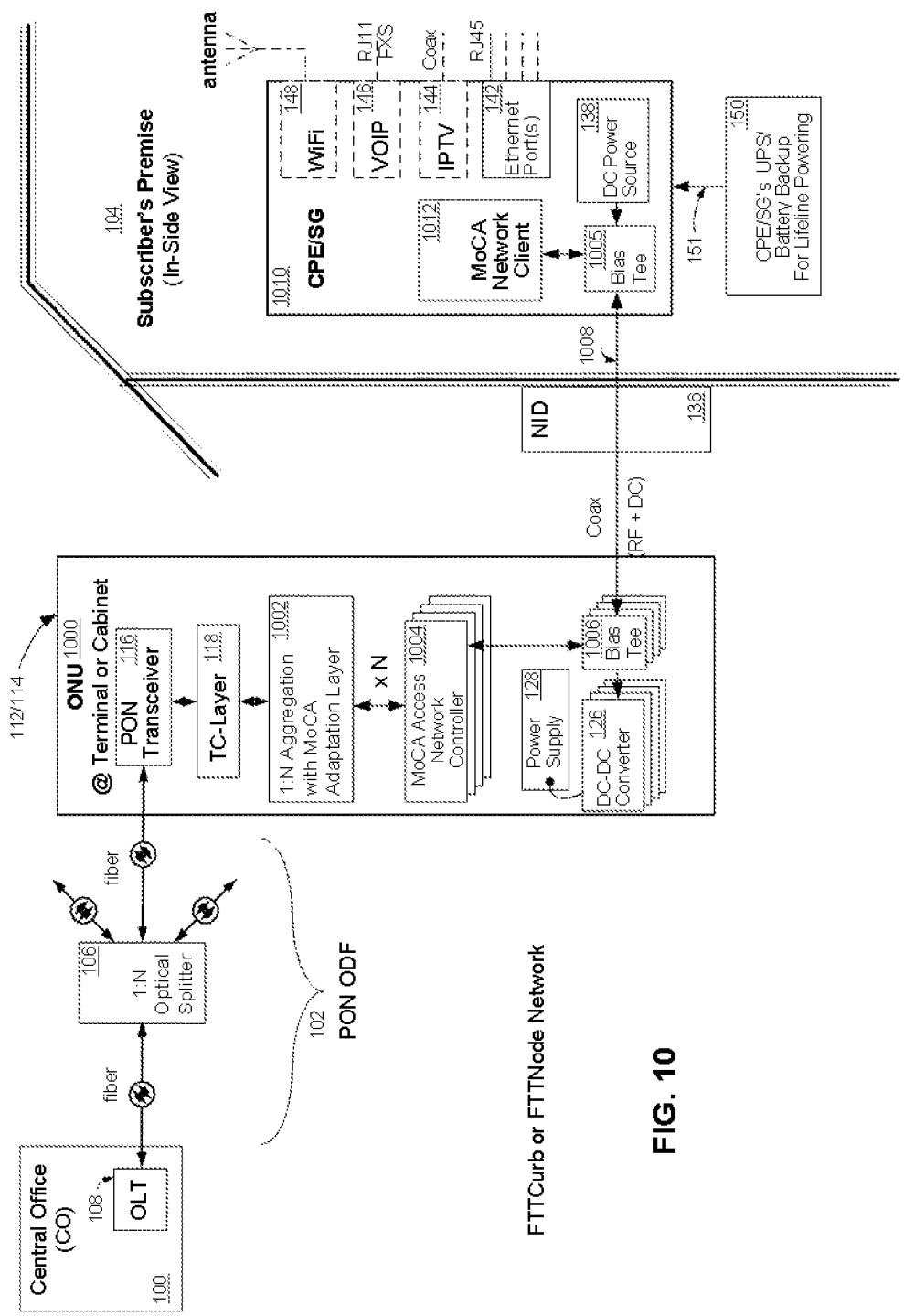
FIG. 10 is a block diagram illustration of a FTTC or FTTN point-to-multipoint PON with an ONU network element powered by a subscriber's CPE or SG using a coax cable, in accordance with an embodiment of the present invention.

Referring now to FIG. 10, an alternative embodiment of the invention in accordance with the present invention is illustrated wherein a FTTP or FTTH network is shown with a subscriber-powered ONU 1000, which is in communication with a subscriber's gateway or CPE 1010 over a coaxial cable 1008 using Multimedia over Coax Alliance (MoCA) devices 1004/1012. The FTTP or FTTH network shown being a passive optical network (PON) implementation. MoCA is an industry driven specification for delivering networking, high-speed data, digital video, and entertainment services through existing coaxial cables in homes.

A CPE/SG 1010 comprising a MoCA network client 1012 device is in electrical communication with a first bias tee device 1005. Bias tees are coaxial components that are used whenever a source of DC power is connected to a coaxial cable. The bias tee does not affect the AC or RF transmission through the cable. The first bias tee device 1005 passes MoCA electrical signals as well as DC power from a DC power source 138 over coax cable 1008 to a second bias tee device 1006 in the ONU 1000, the ONU 1000 being located away from the NID 136 and serves a plurality of subscribers. The second bias tee device 1006 is capable of decoupling the MoCA electrical signals, which are then provided to the MoCA access network controller device 1004 and provide the driven DC power to the ONU 1000 DC-to-DC converter 126. The DC-to-DC converter 126 supplying the appropriate DC current and DC voltage needs of the ONT 1000 to the power supply 128. The MoCA access network controller device 1004 is in electrical communication with a 1:N Aggregation with MoCA adaptation layer device 1002 that aggregates or multiplexes the broadband communication flow between the CO and subscribers. The CPE/SG 1010 is provided power during subscriber power outages by a UPS/battery backup 150 for lifeline powering requirements. In this way, a bias tee device serves to inject DC power to supply the needs of the ONU 1000 while combining MoCA signals on a same coax cable.

Figure 11:
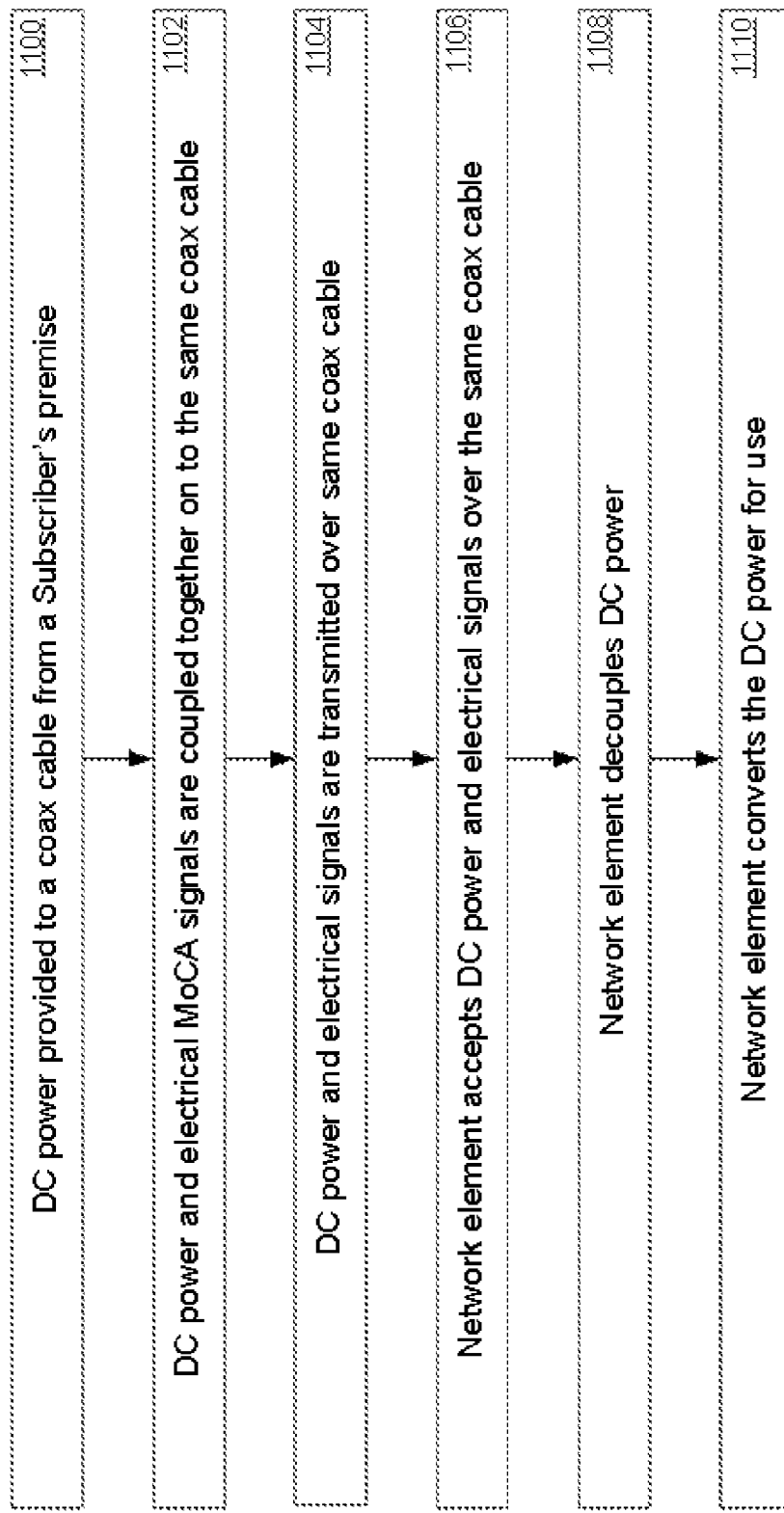
FIG. 11 is a flow chart illustration of a method of the present invention for powering a network element utilizing power over coax cable.

Referring to FIG. 11 in view of FIG. 10, a flow chart of a method of the present invention utilizing power over coax is illustrated. Powering a network element of a FTTP or FTTH network, such as ONU 1000 in FIG. 10, from a subscriber's premise 104 entails providing or supplying a DC power 138 to a coaxial cable 1008 from a subscriber premise as indicated by block 1100. At block 1102, electrical MoCA communications or signals from the MoCA network client device 1012 are coupled to the same coax cable 1008 with the DC power. At block 1104, the DC power and electrical MoCA signals are transmitted, driven or sent across the coax cable 1108 from the subscriber premise 104 to the network element, such as ONU 1000. At block 1106, the driven DC power and electrical MoCA signals are accepted or received at the network element over the same coax cable 1008. At block 1108, the network element decouples the electrical MoCA signals from the DC power, or vice versa with the second bias tee device 1006. At block 1110, the network element performs DC-to-DC power conversion on the supplied and decoupled DC power for use by the network element.

Figure 12:
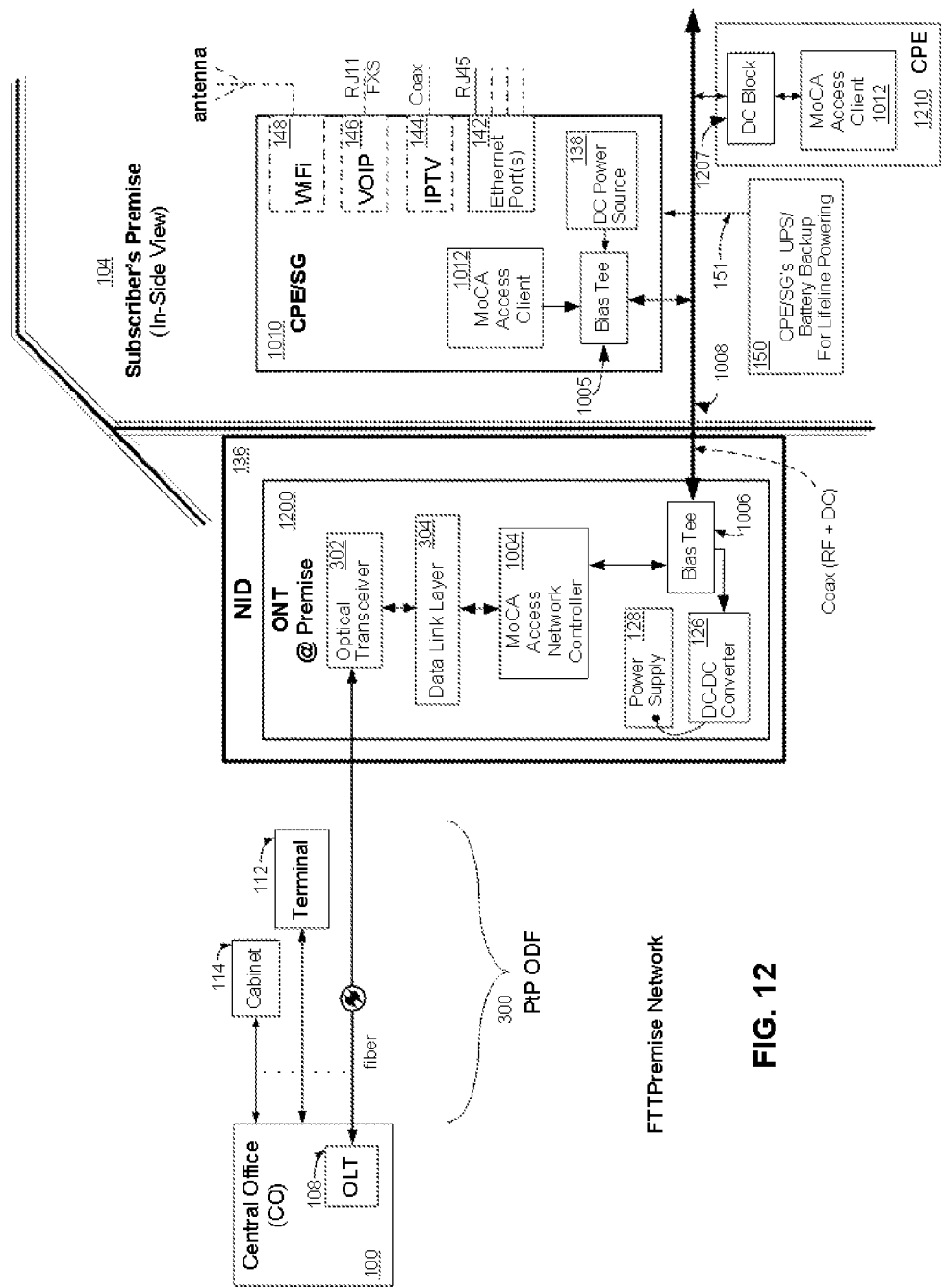
FIG. 12 is a block diagram illustration of a FTTP point-to-point optical network with an ONT network element powered by subscriber's CPE or SG using power over coax cable, in accordance with an embodiment of the present invention.

Referring to FIG. 12, an alternative embodiment of the invention in accordance with the present invention is illustrated wherein a FTTP or FTTH network is shown wherein the implementation of the network is a point-to-point (PtP) fiber optic network. The ODF 300 lacks passive splitters and illustrates the one-to-one direct connection between terminals 112, cabinets 114, NIDs 136 and the CO 100. Such PtP networks may be implemented by a point-to-point gigabit Ethernet network with complementary components such as optical transceiver 302 and data link layer 304 in accordance with whatever specific protocol is chosen for the network implementation. FIG. 12 serves to show that the power over coax method of the invention as previously described, as in FIG. 10, is a method apathetic and even naïve of the design choice or implementation of the fiber in the loop network. The method works equally well for both PtP and PON networks. FIG. 12 also serves to illustrate the power over coax method with an ONT 1200 as well as to show compatibility with other MoCA capable CPE devices 1210 that share network communications with the MoCA access network controller 1004 on the same coax cable 1008, though such compatibility can be used with ONUs as well. FIG. 12 also serves to illustrate the use of a an optical transceiver 302 and data link layer 304, in accordance with whatever specific protocol is chosen for the network implementation, that does not need to do 1:N aggregation or multiplexing of multiple MoCA connections. A DC block 1207 is used to isolate DC power while allowing data signals to pass through unaffected to allow use of other CPEs 1210 that do not provide DC power to the coax cable 1008. The DC block 1207 may be internal to the CPE 1210 or external (not shown). The CPE/SG 1010 is provided power during subscriber power outages by a UPS/battery backup 150 for lifeline powering requirements.

Figure 13A:
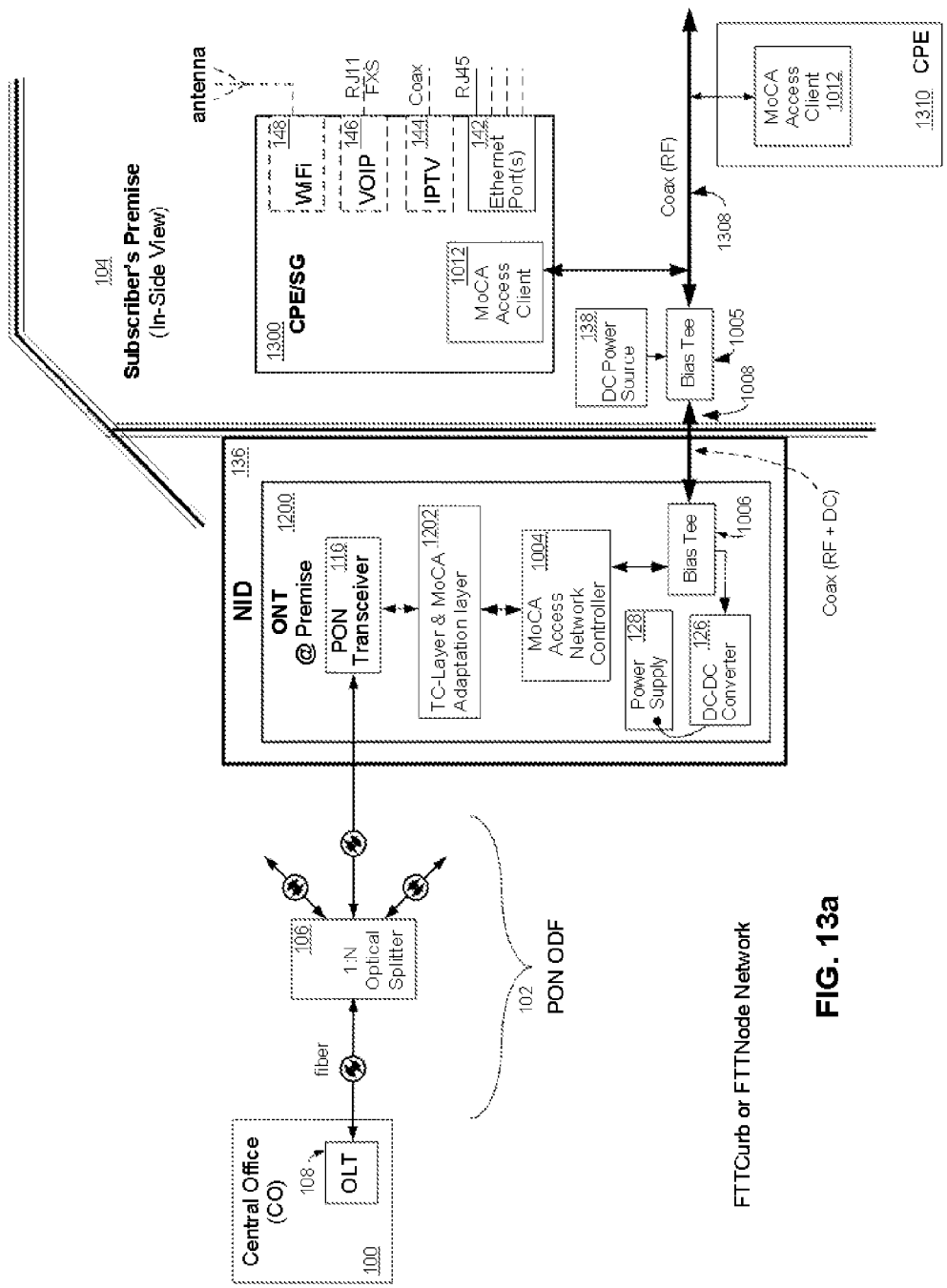
FIG. 13a is a block diagram illustration of a FTTC or FTTN point-to-multipoint PON with an ONT network element powered by a subscriber's CPE or SG using a coax cable, in accordance with an embodiment of the present invention.

Referring to FIG. 13a, an alternative embodiment of the invention using a FTTC or FTTN network is shown wherein the implementation of the network is a PON 102. In this embodiment the bias tee 1005 and DC power source 138 are external to the CPE/SG 1300. The bias tee 1005 combining the MoCA or RF communications from coax cable 1308 onto coax cable 1008 with DC power from the DC power source 138. This allows simplification of CPE/SG devices 1300/1310.

Figure 13B:
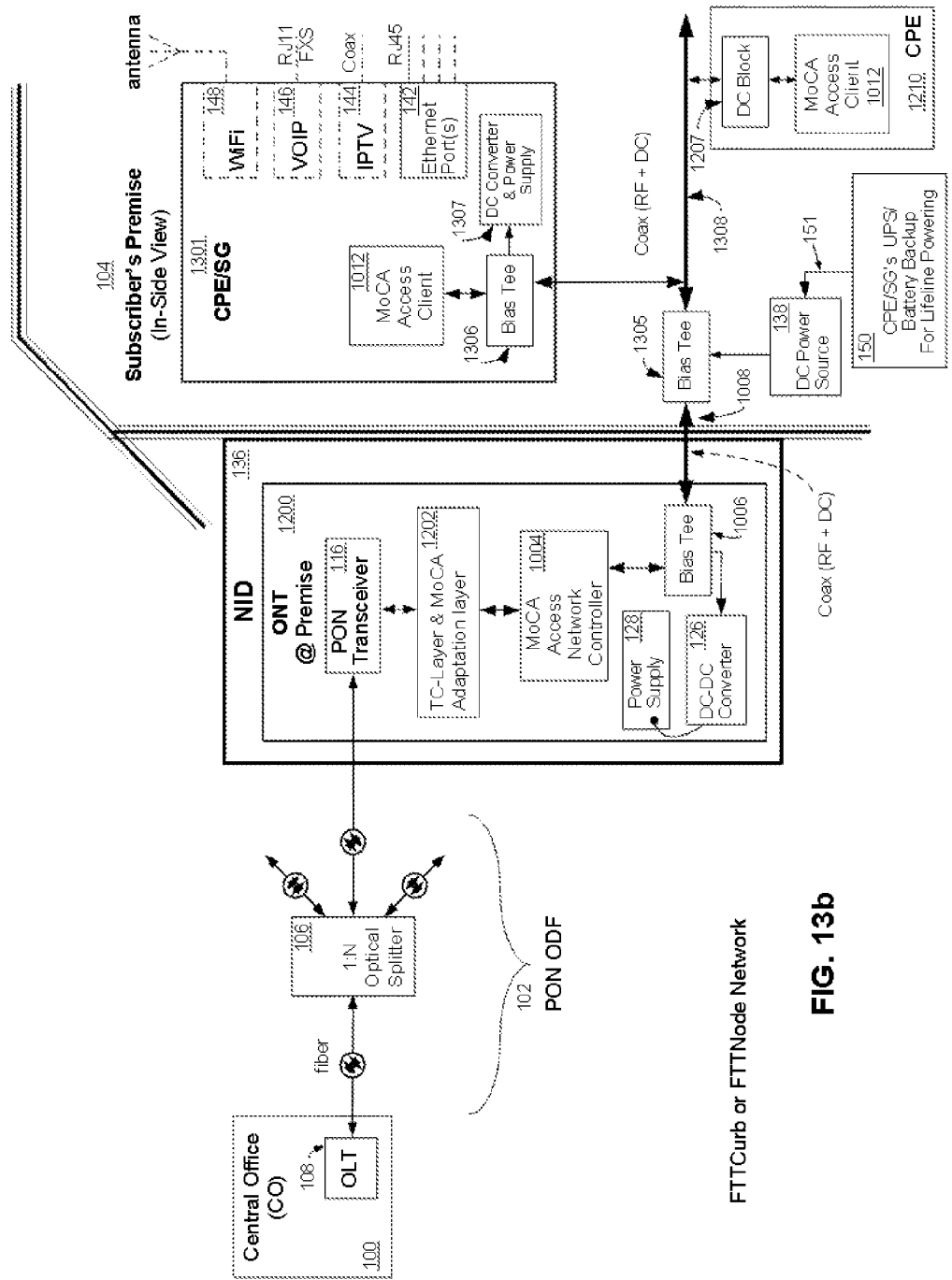
FIG. 13b is a block diagram illustration of a FTTC or FTTN point-to-multipoint PON with an ONT network element powered by a subscriber's CPE or SG using a coax cable, in accordance with an embodiment of the present invention.

Referring to FIG. 13b, an alternative embodiment of the invention using a FTTC or FTTN network is shown wherein the implementation of the network is a PON 102. In this embodiment the bias tee 1305 and DC power source 138 are external to the CPE/SG 1301 and a UPS/battery backup source 150 for DC power source 138 is provided which may be required for regulatory obligations. The bias tee 1305 combining the MoCA or RF communications from coax cables 1308 and 1008 with DC power from the DC power source 138. CPE/SG 1301 has a bias tee 1306 that decouples MoCA or RF communications and DC power from coax cable 1308. Bias tee 1306 providing DC power to the CPE/SG 1301's power supply 1307. The embodiment enables CPE/SG 1301 to be powered by an external power supply via the same coax cable used for network communications.

Figure 14A:
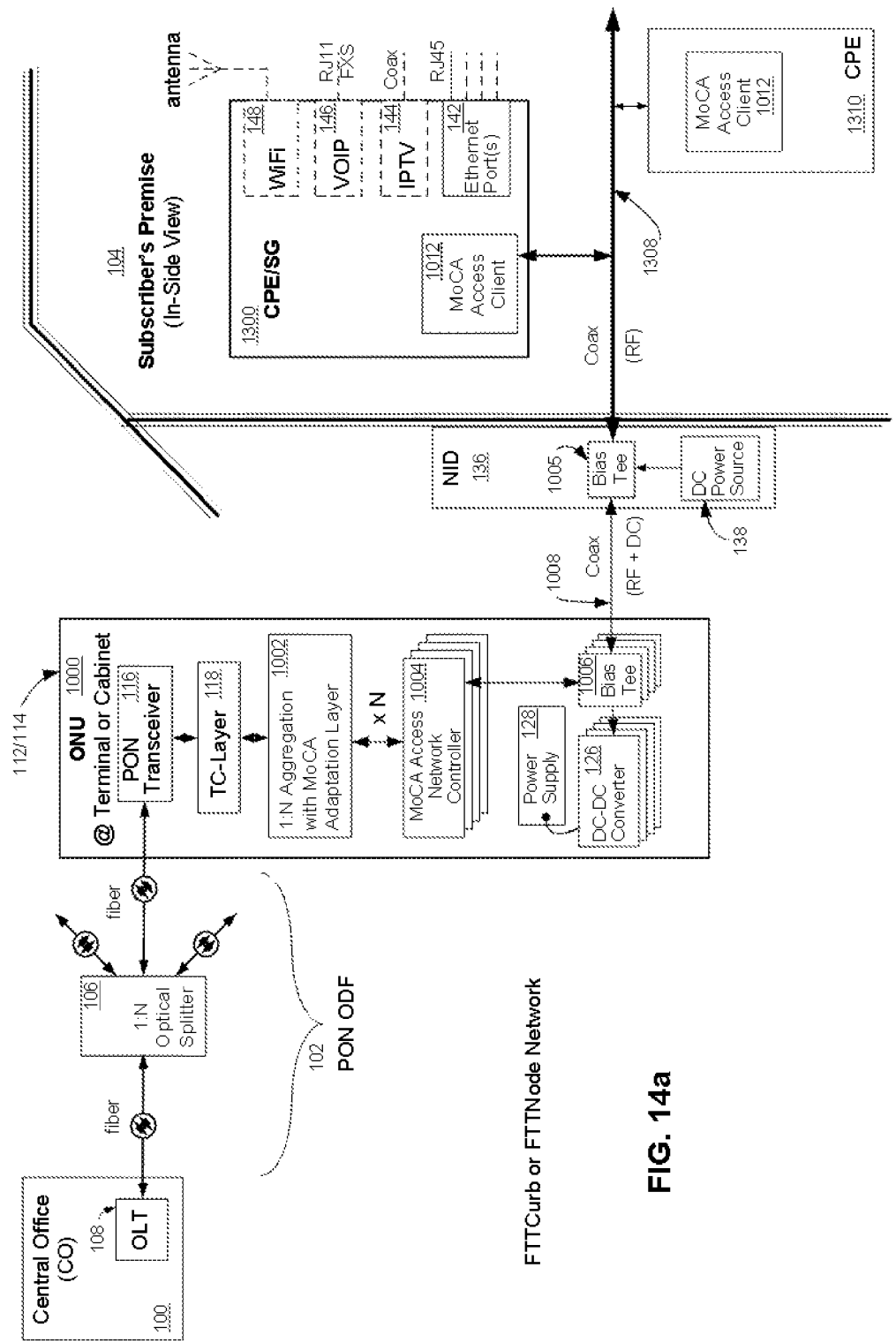
FIG. 14a is a block diagram illustration of a FTTC or FTTN point-to-multipoint PON with an ONU network element powered by a subscriber's CPE or SG using a coax cable, in accordance with an embodiment of the present invention.

Referring to FIG. 14a, an alternative embodiment of the invention using a FTTC or FTTN network is shown wherein the implementation of the network is a PON. In this embodiment the bias tee 1005 and DC power source 138 are external to the CPE/SG 1300 and are located in or near the NID 136. The bias tee 1005 combining MoCA or RF communications from coax cable 1308 onto coax cable 1008 with the DC power from the DC power source 138. This allows simplification of CPE/SG devices 1300/1310 and simplification of subscriber installation. Generally, power is not available at the NID 136, however power at the NID may be available in future Greenfield installations.

Figure 14B:
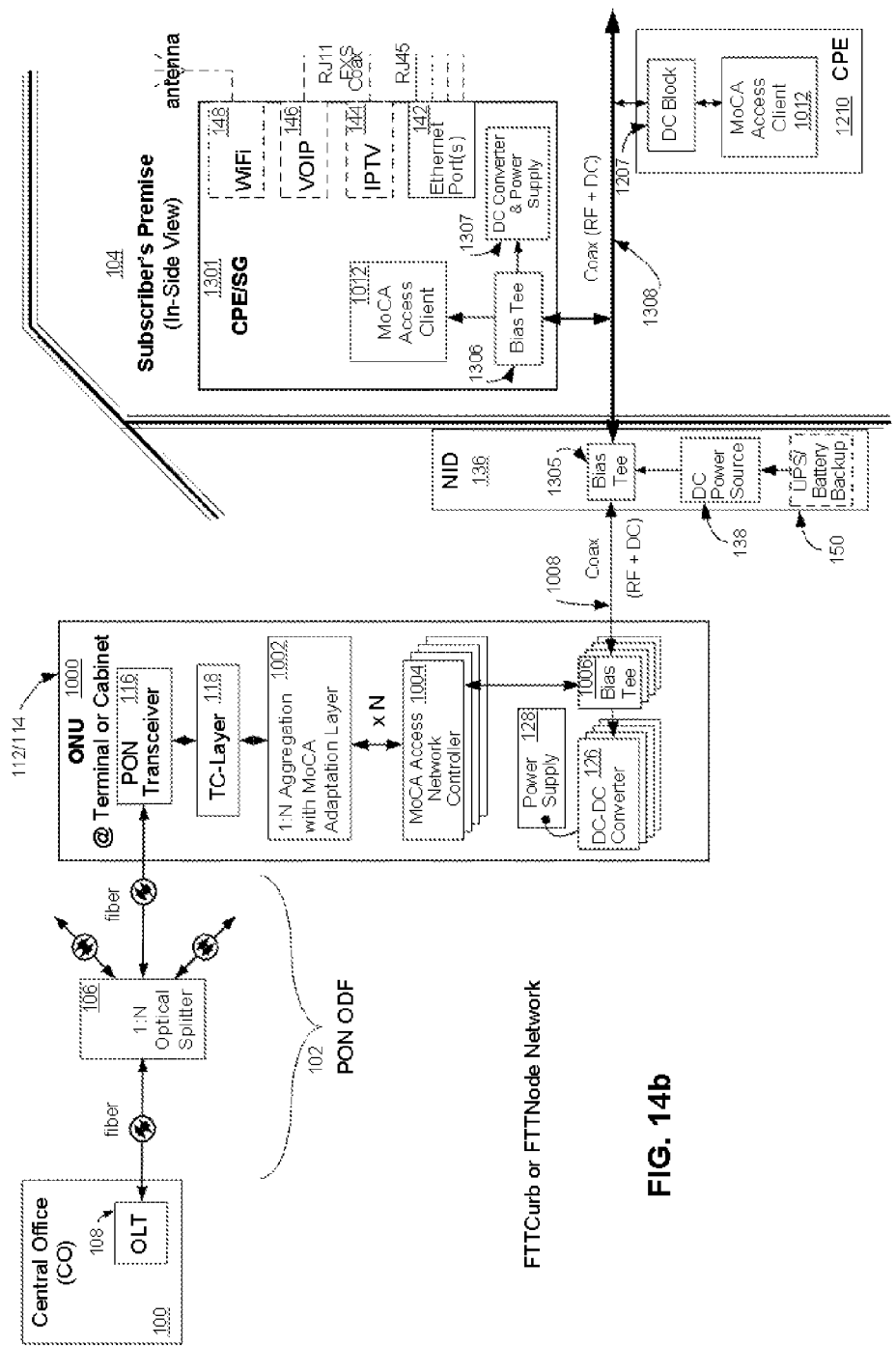
FIG. 14b is a block diagram illustration of a FTTC or FTTN point-to-multipoint PON with an ONU network element powered by a subscriber's CPE or SG using a coax cable, in accordance with an embodiment of the present invention.

Referring to FIG. 14b, an alternative embodiment of the invention using a FTTC or FTTN network is shown wherein the implementation of the network is a PON. In this embodiment the bias tee 1005, DC power source 138 and a UPS/battery backup source 150 are external to the CPE/SG 1301 and are located in or near the NID 136. The bias tee 1005 combining MoCA or R° F. communications from coax cables 1308 and 1008 with the DC power from the DC power source 138. This allows simplification of subscriber installation as well as enabling lifeline services with UPS/battery backup source 150 providing power during electrical blackout.

In yet another alternative embodiment of the invention in accordance with the present invention, HomePNA is used as the communication method between an ONU/ONT and a subscriber's gateway/CPE. HomePNA is an industry standard for home networking solutions based on internationally recognized, open and interoperable standards that allow worldwide distribution of triple-play services, such as IPTV, voice and Internet data by leverage existing telephone wires (twisted copper pair) or coax cable. Thus, alternative embodiments of FIGS. 1-6 are possible substituting xDSL devices with HomePNA capable devices for subscriber powering network elements over twisted copper pairs as well as FIGS. 10-14b with substitution of MoCA devices with HomePNA capable devices for subscriber powering network elements over coax cable.

In yet another alternative embodiment of the invention in accordance with the present invention, ITU's G.hn is used as the communication method between an ONU/ONT and a subscriber's gateway/CPE. G.hn is yet another industry standard for home networking solutions based on internationally recognized, open and interoperable standards that allow worldwide distribution of triple-play services, such as IPTV, voice and Internet data by leverage existing telephone wires (twisted copper pair) or coax cable. Thus, alternative embodiments of FIGS. 1-6 are possible substituting xDSL devices with G.hn capable devices for subscriber powering network elements over twisted copper pairs as well as FIGS. 10-14b with substitution of MoCA devices with G.hn capable devices for subscriber powering network elements over coax cable.

While DC power is the preferred method of delivering power from a subscriber's premise to a network element, AC power is also possible. Alternate embodiments of FIGS. 1-6 and FIGS. 10-14b are possible with substitution of DC power with AC power. Alternate embodiments wherein elements such as: DC power source 138, 1307; DC-DC converter 126; SLIC 132; DAA 124, 125; bias tee 1005, 1006, 1305, 1306; DC block 1207 or UPS backup 150 are appropriately substituted or designed with AC power in mind are also possible.

While UPS/battery backup 150 in various embodiments of the present invention has been shown to be an external device. Alternate embodiments with the UPS/battery backup 150 internal to the CPE, communication and/or power-coupling device are possible (not shown). It will be appreciated by those skilled in the arts, that during lifeline powering events that network elements such as ONUs and ONTs and CPE/SG equipment may power down non-essential devices to extend the time that lifeline services can be provided. Such powering down may also include reducing the line rates of communications.

Future regulations may require carriers to reimburse subscribers for the power used by network elements that are power from a subscriber premises'. In which case, in the various embodiments of the present invention the network elements such as ONU or ONT have power meters to measure their power usage (not shown). Additionally, alternative embodiments of the ONUs and ONTs with power meters may report their power usage back to the OLT or have their meters reset, via their management or control channel with the OLT.

Although the invention has been described in terms of particular implementations, one of ordinary skill in the art, in light of this teaching, can generate additional implementations and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A system for electrically powering a network element of a communication network for communicating data between a service provider and a subscriber premise, the network element coupled to at least one optical fiber from the service provider and coupled to at least one electrical wire or cable from the subscriber premise, the system comprising:

at the subscriber premise,
    a power source producing an electrical power output having a current and a voltage,
    a first communication device for transmitting and receiving electrical communication signals, and
    a first electrical coupling device coupled to the electrical wire or cable and coupled to the power source and the first communication device for combining the electrical power output of the power source with the electrical communication signals of the first communication device as a combined signal onto the electrical wire or cable for transmission to the network element; and at the network element,
    a second electrical coupling device coupled to the electrical wire or cable from the subscriber premise for separating the electrical power output from the electrical communication signals,
    a second communication device coupled to the second electrical coupling device for receiving and transmitting electrical communication signals, and
    a power converter coupled to the second communication device for accepting the electrical power output and to provide the electrical power for use by the network element; whereby the network element is in communication with the service provider over the optical fiber and is electrically powered from the subscriber premise through the same electrical wire or cable carrying the electrical communication signals between the network element and the subscriber premise.

\* \* \* \* \*